(12) United States Patent
Matsumoto

(10) Patent No.: US 7,885,022 B2
(45) Date of Patent: Feb. 8, 2011

(54) SWINGING AND TILTING MECHANISM, LENS BARREL, AND IMAGE CAPTURE APPARATUS

(75) Inventor: Kenichi Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 12/318,643

(22) Filed: Jan. 5, 2009

(65) Prior Publication Data

US 2009/0201595 A1    Aug. 13, 2009

(30) Foreign Application Priority Data

Feb. 13, 2008    (JP) .............................. 2008-032260

(51) Int. Cl.
*G02B 7/02* (2006.01)
(52) U.S. Cl. ...................................................... 359/822
(58) Field of Classification Search ................. 359/822, 359/823, 830
See application file for complete search history.

(56) References Cited

FOREIGN PATENT DOCUMENTS

| JP | 61-086740 A | 5/1986 |
|---|---|---|
| JP | 07-239434 A | 9/1995 |
| JP | 07-333481 A | 12/1995 |
| JP | 2000-066263 | 3/2000 |
| JP | 2000-089284 A | 3/2000 |
| JP | 2007-108460 A | 4/2007 |

OTHER PUBLICATIONS

Japanese Office Action issued Nov. 4, 2009 for corresponding Japanese Application No. 2008-032260.

*Primary Examiner*—Alicia M Harrington
(74) *Attorney, Agent, or Firm*—Rader, Fishman & Grauer PLLC

(57) ABSTRACT

A swinging and tilting mechanism includes a lens, a lens holding frame that holds the lens, a fixed member, and an operation member. The fixed member includes a rotation support portion that rotatably supports the lens holding frame in at least one side surface in one direction perpendicular to an optical axis of an optical system, and a tilting support portion that supports the lens holding frame tiltably in a direction of the optical axis in at least one side surface in another direction perpendicular to the optical axis and the one direction. The operation member rotates the lens holding frame supported by the fixed member with the rotation support portion used as a support point, and tilts the same along the tilting support portion.

14 Claims, 17 Drawing Sheets

FIG. 11

| | FIRST OPERATION RING GEAR PORTION | FIRST GEAR LARGE-DIAMETER GEAR | FIRST GEAR SMALL-DIAMETER GEAR | SECOND GEAR | FIXED RING GEAR PORTION |
|---|---|---|---|---|---|
| REFERENCE CIRCLE DIAMETER (MM) | 60.8 | 7.6 | 5.4 | 7.2 | 43.2 |
| MODULE | 0.4 | 0.4 | 0.45 | 0.45 | 0.45 |
| NO. OF TEETH | 152 | 19 | 12 | 16 | 96 |

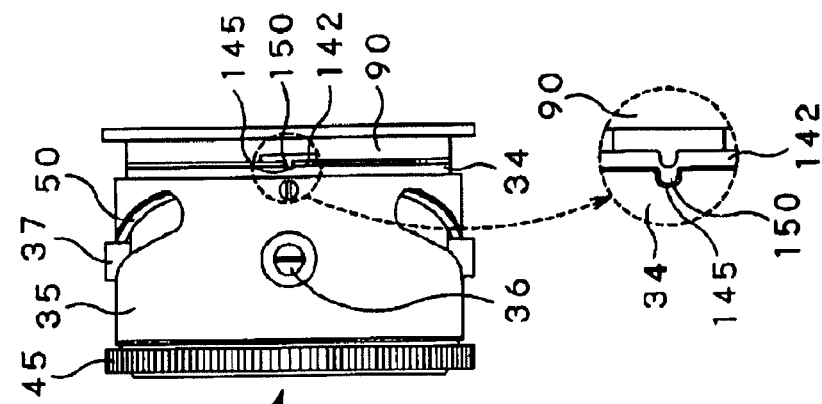
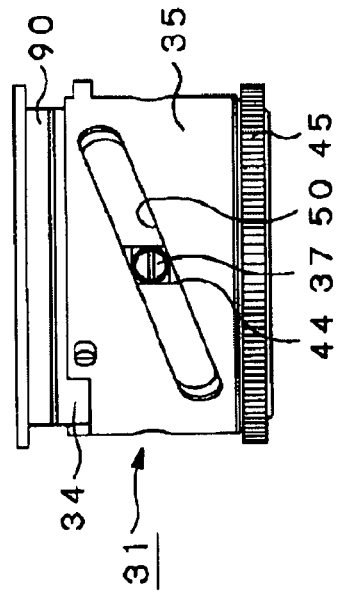
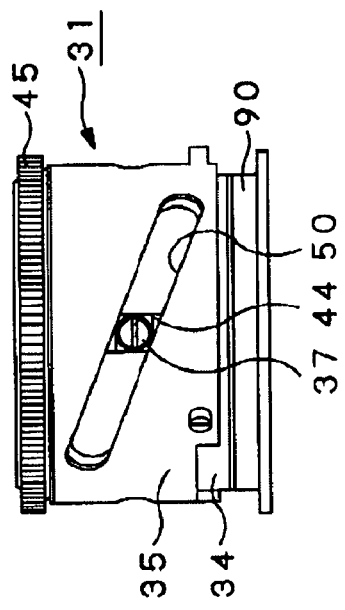
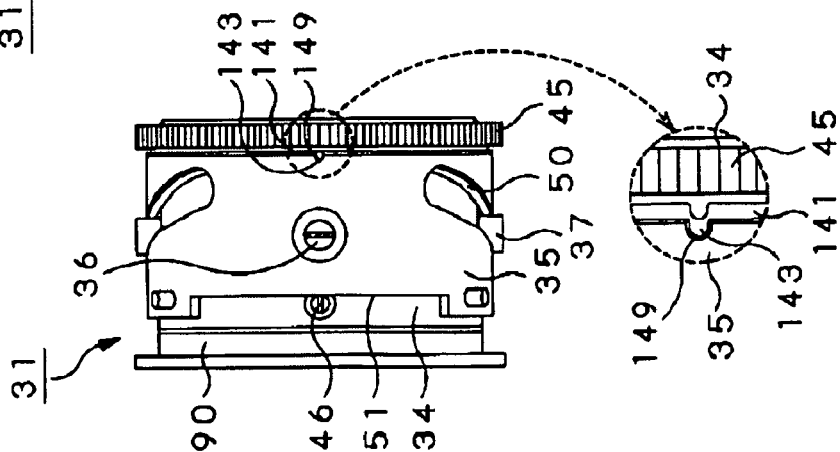

SWINGING AND TILTING MECHANISM, LENS BARREL, AND IMAGE CAPTURE APPARATUS

CROSS REFERENCES TO RELATED APPLICATIONS

The present invention contains subject matter related to Japanese Patent Application JP 2008-032260 filed in the Japanese Patent Office on Feb. 13, 2008, the entire contents of which are incorporated herein by reference.

BACKGROUND OF THE INVENTION

1. Field of the Invention

The present invention relates to a swinging and tilting mechanism, a lens barrel, and an image capture apparatus making up an optical system enabling so-called swinging and tilting photographing based on the Scheimpflug principle.

2. Description of the Related Art

In related art, a lens barrel enabling swinging and tilting photographing by displacing an optical axis of a photographing optical system from a center of a film or an imager device has been provided. This type of lens barrel includes a bellows that connects a support plate attached to a lens mount and a support plate provided on a body mount side, using a bellows attachment, and a support mechanism that slidably supports both the support plates to slide the lens barrel. Moreover, there is also proposed a swinging and tilting lens barrel using a cam mechanism that is more simplified in configuration than the lens barrel using the bellows attachment, and is easy to handle and carry (see Japanese Patent Application Laid-Open No. 2000-66263 (Patent Document 1)).

The lens barrel described in Patent Document 1 includes a lens holding frame that holds a lens, a reference cylinder in which rectilinear grooves through which a plurality of guide pins projected from the lens holding frame are inserted are extended in an optical axis direction, and a cam cylinder that is externally fitted onto the reference cylinder so as to be circumferentially rotatable, and is formed with cam grooves with which the respective guide pins inserted through the rectilinear grooves are engaged. The cam grooves formed in the cam cylinder include linear groove portions that is formed along a circumferential direction about an optical axis, and inclination groove portions that incline in the optical axis direction with respect to the linear groove portions, along a circumferential direction of the cam cylinder.

In the above-described lens barrel, the rotation of the cam cylinder allows the guide pins to be moved in accordance with the cam groove shape and tilted along the rectilinear grooves provided in the reference cylinder. Thereby, the lens held by the lens holding frame is tilted with respect to the direction where the rectilinear grooves are formed, so that tilting or swinging operation is performed.

SUMMARY OF THE INVENTION

However, in the related art lens barrel, since the lens holding frame that holds the lens is supported only by inserting the guide pins through the long-hole shaped rectilinear grooves drilled along the optical axis direction in the outer periphery of the reference cylinder and the cam grooves formed along the circumferential direction of the cam cylinder, the lens holding frame may not be held in a state where the optical axis of the lens held by the lens holding frame is made to coincide with the optical axis of the optical system, so that centering may not be surely performed.

Moreover, in the related art lens barrel, tilting directions of the lens are defined by formation positions of the plurality of rectilinear grooves provided in the reference cylinder. That is, for example, when the rectilinear grooves are formed in four positions of both side surfaces in one direction perpendicular to the optical axis of the reference cylinder, and both side surfaces in another direction perpendicular to the optical axis and the above-described one direction, the tilting directions of the lens are only four vertical and horizontal directions, and the lens may not be tilted in a direction other than these. Accordingly, the tilting direction of the lens may not be adjusted in accordance with all photographing aspects.

Consequently, it is desirable to provide a swinging and tilting mechanism, a lens barrel and an image capture apparatus that surely enable centering of a lens and enable tilting directions of the lens to be adjusted in accordance with all photographing aspects.

In one embodiment of the present invention, there is provided a swinging and tilting mechanism which includes a lens, a lens holding frame that holds the lens, a fixed member including a rotation support portion that rotatably supports the lens holding frame in at least one side surface in one direction perpendicular to an optical axis of an optical system, and a tilting support portion that supports the lens holding frame tiltably in a direction of the optical axis in at least one side surface in another direction perpendicular to the optical axis and the one direction, and an operation member that rotates the lens holding frame supported by the fixed member with the rotation support portion used as a support point, and tilts the same along the tilting support portion.

In another embodiment of the present invention, there is provided a lens barrel which includes a swinging and tilting mechanism having a lens, a lens holding frame that holds the lens, a fixed ring including a rotation support portion that rotatably supports the lens holding frame in at least one side surface in one direction perpendicular to an optical axis of an optical system, and a tilting support portion that supports the lens holding frame tiltably in a direction of the optical axis in at least one side surface in another direction perpendicular to the optical axis and the one direction, and a rotary ring that is fitted onto the fixed ring to thereby be rotatably supported along an outer periphery of the fixed ring, and is formed with a pair of guide grooves that guides a pair of guide portions of the lens holding frame supported by the tilting support portions formed in both side surfaces in the another direction of the fixed ring, along a peripheral surface thereof, and rotates the lens holding frame supported by the fixed ring with the rotation support portion used as a support point, and tilts the same along the tilting support portions, a fixed cylinder that supports the swinging and tilting mechanism rotatably centering on the optical axis, a first operation member that is coupled to the fixed ring of the swinging and tilting mechanism to rotate the swinging and tilting mechanism centering on the optical axis, and a second operation member that is engaged with the rotary ring of the swinging and tilting mechanism to tilt the lens along the tilting support portions.

In still another embodiment of the present invention, there is provided an image capture apparatus which includes a swinging and tilting mechanism having a lens, a lens holding frame that holds the lens, a fixed member including a rotation support portion that rotatably supports the lens holding frame in at least one side surface in one direction perpendicular to an optical axis of an optical system, and a tilting support portion that supports the lens holding frame tiltably in a direction of the optical axis in at least one side surface in another direction perpendicular to the optical axis and the one direction, and an operation member that rotates the lens holding frame supported by the fixed member with the rotation support portion used as a support point, and tilts the same along the tilting support portion.

According to the above embodiments of the present invention, since the lens holding frame holding the lens is supported by the fixed member rotatably in the one direction perpendicular to the optical axis of the lens, and is supported tiltably along the optical axis direction in the another direction perpendicular to the optical axis of the lens and the one direction in which the lens holding frame is supported rotationally, a position of the lens with respect to the fixed member is determined precisely, and centering can be surely performed.

Moreover, according to the above embodiments of the present invention, the operation member is operated to thereby tilt the lens with respect to the fixed member, by which a swinging and tilting amount can be adjusted, and this fixed member is rotation-operated centering on the optical axis, by which a swinging and tilting direction can be adjusted, so that the lens can be swung and tilted omnidirectionally.

BRIEF DESCRIPTION OF THE DRAWINGS

FIG. 11 is a table showing a data example of respective gears of a fixed ring, a first operation ring and a gear mechanism;

FIGS. 16A to 16D are side views each showing the swinging and tilting mechanism set in the neutral position and a reference position.

DESCRIPTION OF THE PREFERRED EMBODIMENTS

Figure 1A:
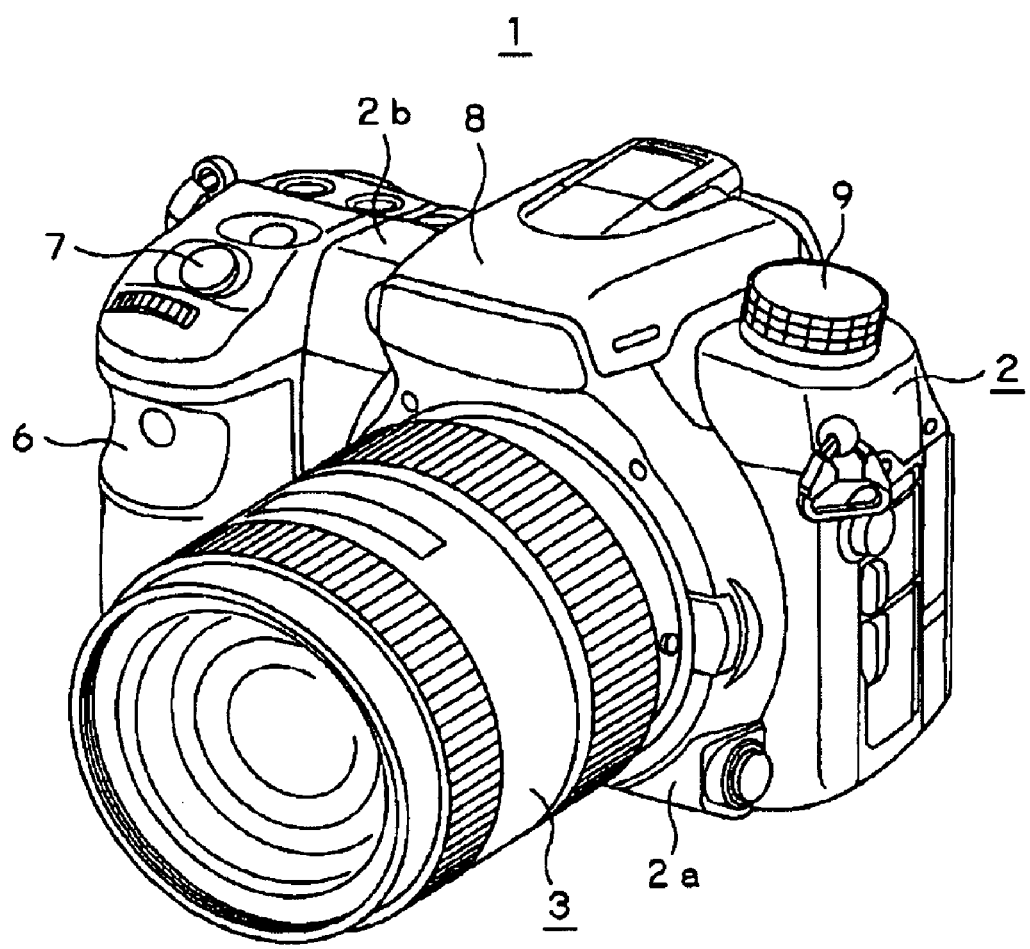
FIG. 1A is an exterior perspective view showing a camera from a front surface side.

Referring to the drawings, embodiments of a swinging and tilting mechanism, a lens barrel and an image capture apparatus to which the present invention is applied are now described in detail.

Figure 1B:
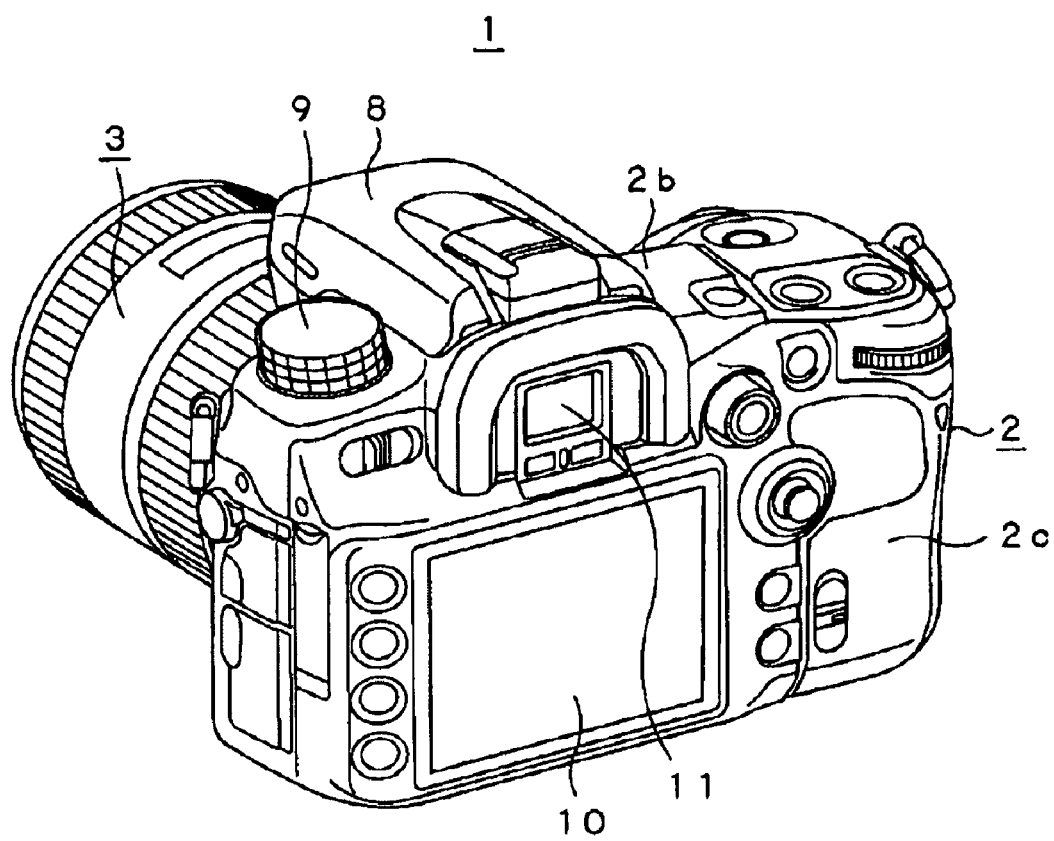
FIG. 1B is an exterior perspective view showing the camera from a back surface side.

A camera 1 according to an embodiment of the present invention is shown in FIGS. 1A and 1B. The camera 1 is a digital still camera or a camera using silver-salt film, and includes a camera body 2 and a photographing lens 3 detachable from the camera body 2.

The camera body 2 is formed into a substantially rectangular shape having an outer form easy for a user to grip with one hand, and in a front surface 2a, a lens mount 5 to which a lens barrel of the photographing lens 3 described later is attached detachably is formed, and a grip portion 6 is formed so as to protrude. The camera body 2 is stably gripped by the user by having the grip portion 6 protruded on a front surface 2a side. Moreover, in the camera body 2, a shutter button 7 is formed on the grip portion 6 so that the user can immediately perform shutter operation while gripping the camera body 2. Thereby, the user can perform the shutter operation while surely gripping the camera body 2, which effectively prevents camera shake and the like.

Moreover, in the camera body 2, a pop-up flash 8, a dial 9 for selecting an operation mode and the like are formed on an upper surface 2b. Also, in the camera body 2, a liquid crystal monitor 10 that displays a through-the-lens-viewed image or a taken image, a viewfinder 11 and various types of operation button groups are formed on a back surface 2c.

Moreover, in the camera body 2, a surface of an imager device such as a CCD or CMOS array, or a film plane is provided perpendicularly to an optical axis of an optical system making up the photographing lens attached to the front surface 2a.

Figure 2:
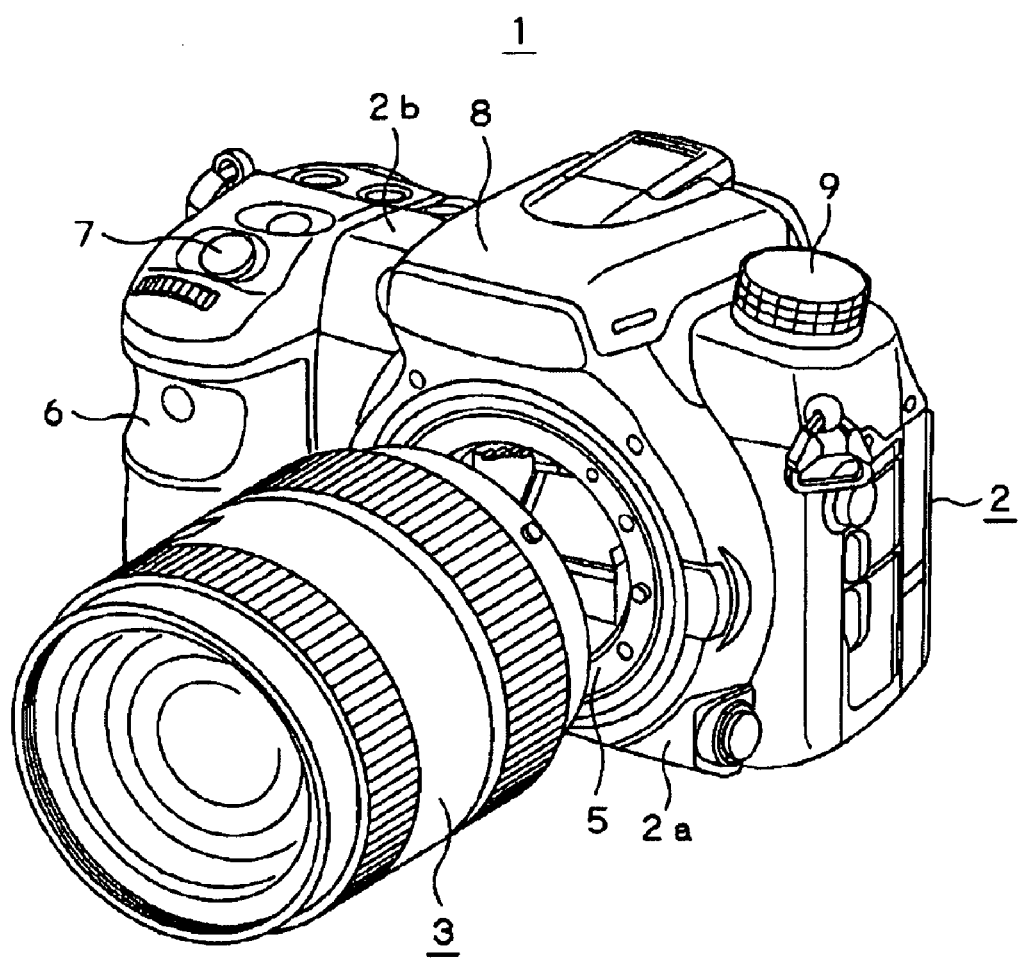
FIG. 2 is a perspective view showing how a photographing lens is attached to a camera body.

In the above-described camera body 2, as shown in FIG. 2, the lens barrel is interchangeably attached to the lens mount 5 formed in the front surface 2a, so that various types of lens barrels can be interchanged in accordance with photographing aspects. In the camera 1, a PC (Perspective Control) lens 20 with a swinging and tilting mechanism incorporated therein is attached to the lens mount 5 of the camera body 2, by which an optical axis of a PC optical system 25 of the PC lens 20 is tilted with respect to a plane center of the imager device inside the camera body 2 to enable so-called swinging and tilting photographing based on the Scheimpflug principle.

Figure 3:
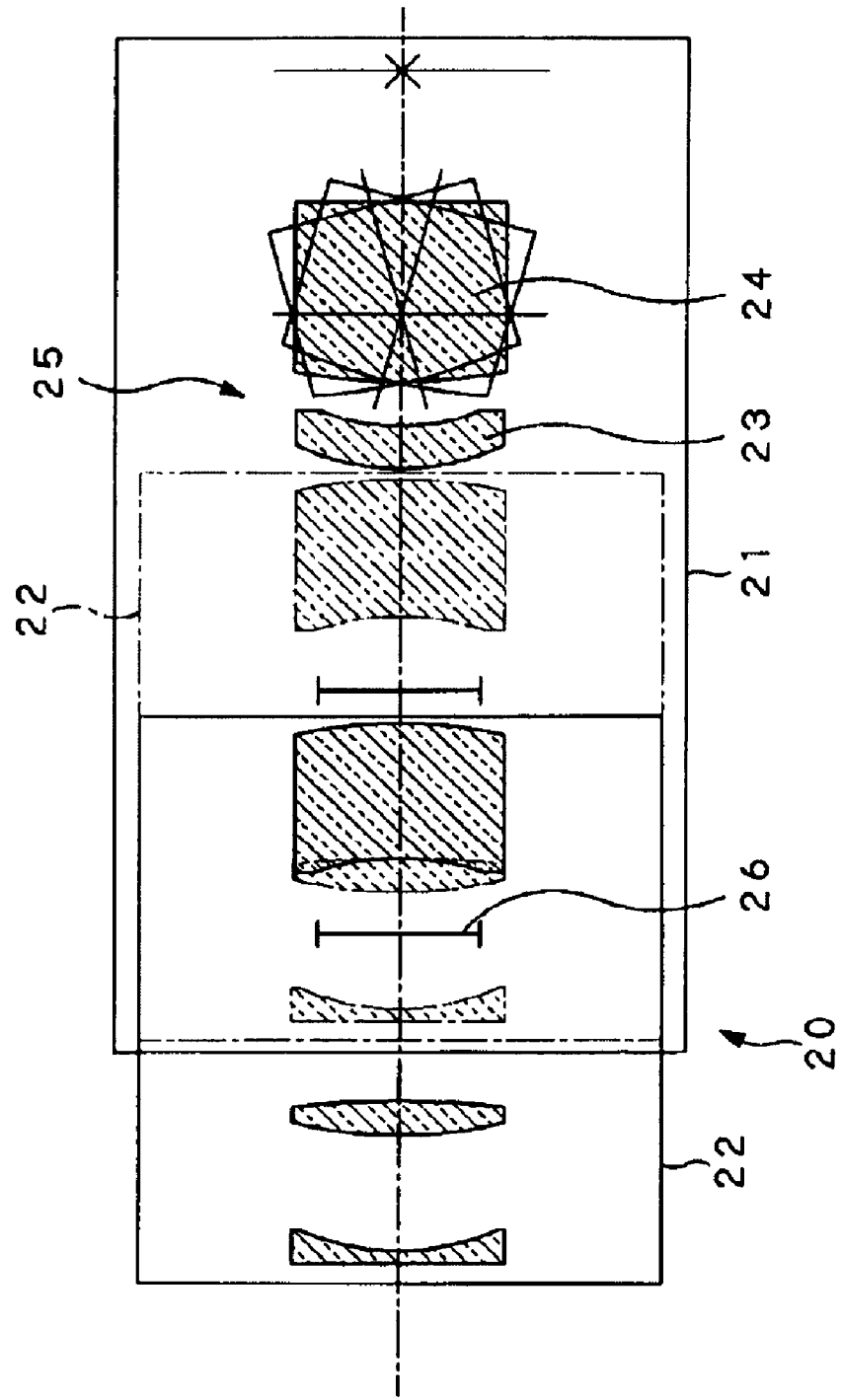
FIG. 3 is a schematic view showing a PC lens configuration.

Subsequently, the PC lens 20 performing the swinging and tilting photographing is described. As shown in FIG. 3, the PC lens 20 has a focus lens group 22, a fixed lens group 23, and a swinging and tilting lens group 24 in order from the front surface side as an object plane inside a cylindrical lens barrel 21, thereby forming the PC optical system 25 made up of these lens groups. The lens barrel 21 has a cylindrical shape, and is provided with a mount ring 61 to be attached to the lens mount 5 of the camera body 2, on a back surface thereof (refer to FIG. 4).

The focus lens group 22 provided on the front surface side of the lens barrel 21 has a plurality of lens groups each of which is made of a combination of a plurality of lenses, and a diaphragm 26, and performs focusing by moving some or all of the plurality of lens groups along the optical axis. In the lens barrel 21, a movement mechanism for focusing by moving the lens groups automatically or manually, and a mechanism for optically setting an F-number are incorporated.

The fixed lens group 23 is a lens group in which a plurality of lenses are combined, and is fixed on a back surface side of the focus lens group 22. On a back surface side of the fixed lens group 23, the swinging and tilting lens group 24 is arranged.

Figure 4:
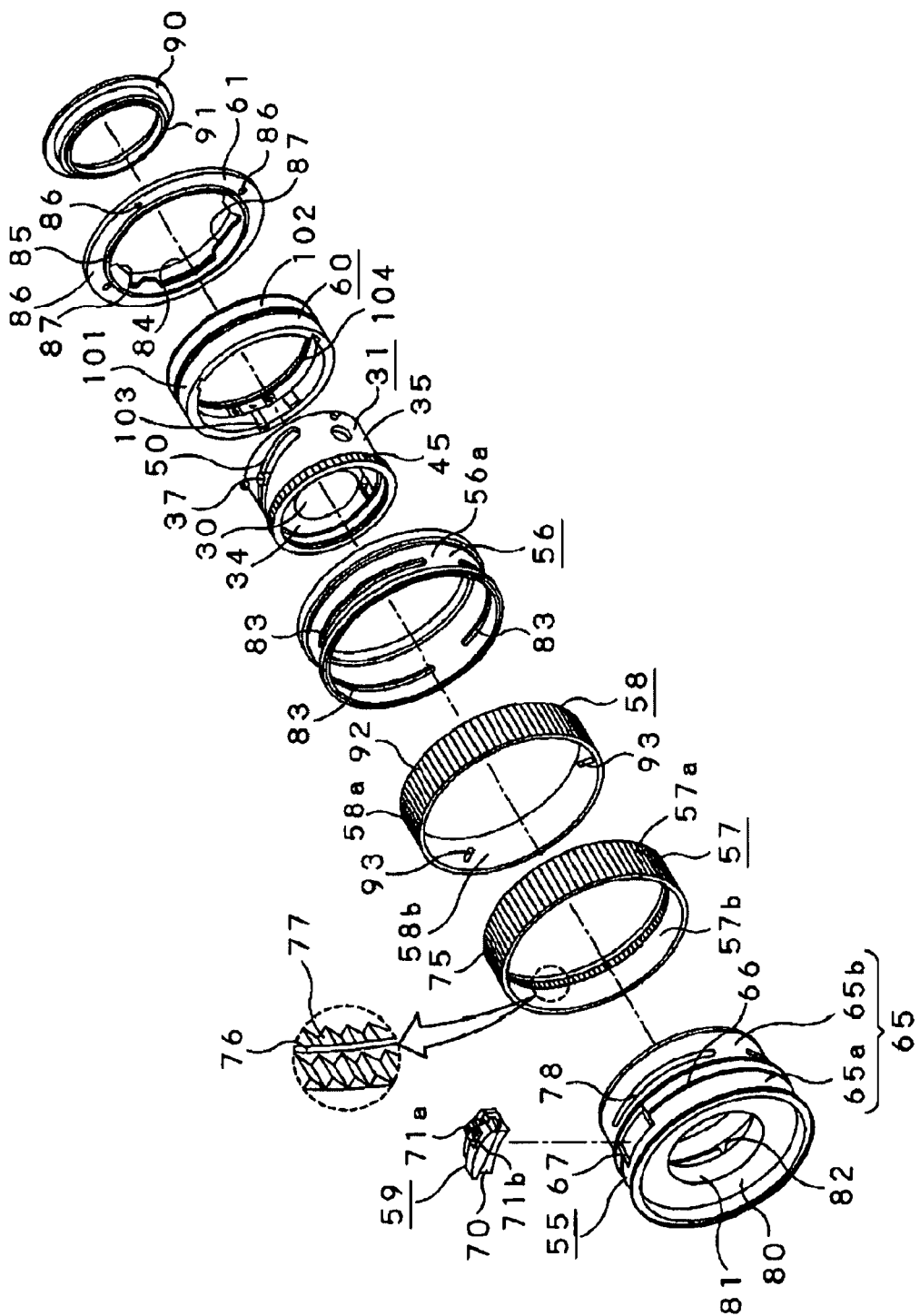
FIG. 4 is an exploded perspective view showing a swinging and tilting lens group incorporated in a lens barrel.

As shown in FIG. 4, the swinging and tilting lens group 24 has a swinging and tilting lens 30 held tiltably with respect to the optical axis of the PC optical system 25, and further has a swinging and tilting mechanism 31 that operates this swinging and tilting lens 30 to tilt toward the optical axis direction, and a rotational operation mechanism 32 that operates a swinging and tilting direction of the swinging and tilting lens 30 by rotation-operating this swinging and tilting mechanism 31.

Figure 5:
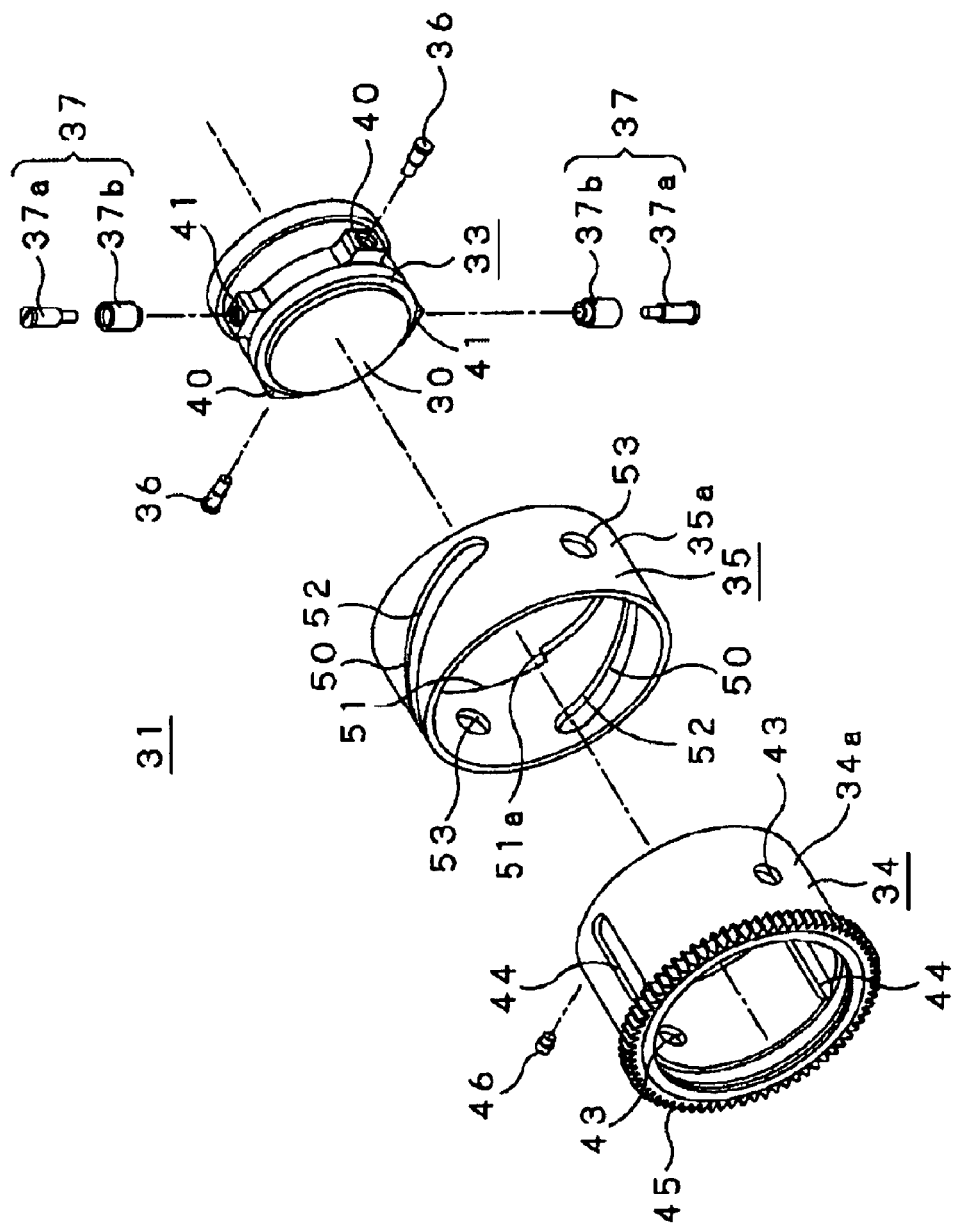
FIG. 5 is an exploded perspective view showing a swinging and tilting mechanism.

As shown in FIG. 5, the swinging and tilting mechanism 31 includes the swinging and tilting lens 30, a lens holding frame 33 that holds the swinging and tilting lens 30, a fixed ring 34 that supports the lens holding frame, and a rotary ring 35 that is fitted onto the fixed ring 34 and tilts the lens holding frame 33. The swinging and tilting lens 30 is made of one or more lenses, and is held by the lens holding frame 33.

The lens holding frame 33 has a hollow cylindrical shape with both ends opened, and holds the swinging and tilting lens 30 in a hollow interior, exposing lens surfaces from the opened ends. Moreover, in the lens holding frame 33, a pair of turning bearings 40, 40, into which support pins 36 turnably supported by the fixed ring 34 are inserted, is formed in an outer peripheral portion. The turning bearings 40, 40 are provided opposed to each other in the outer peripheral portion of the lens holding frame 33, each having an internally threaded shaft hole. The turning bearings 40, 40 allow the externally threaded support pins 36, 36 to be inserted in a manner making axes of these support pins 36 to coincide with each other and further making this axis perpendicular to the optical axis of the swinging and tilting lens 30.

Moreover, in the lens holding frame 33, a pair of guide bearings 41, 41 is formed on the outer peripheral portion thereof. On each of the guide bearings 41, 41, a guide member 37 to be inserted through a tilting support groove 44 of the fixed ring 34 and a tilting guide groove 50 of the rotary ring 35 described later, is mounted. The guide bearings 41, 41 are provided opposed to each other on the outer peripheral portion of the lens holding frame 33, and equally spaced apart from the turning bearings 40, 40. Moreover, each of the guide bearings 41, 41 is provided with a shaft hole having a large-diameter portion and an internally threaded small-diameter portion formed in the center of the large-diameter portion. The guide members 37 fitted into the shaft holes of the guide bearings 41, 41 each include an externally threaded guide pin 37a, and a guide ring 37b into which the guide pin 37a is inserted. The guide ring 37b assures smooth sliding with the tilting support groove 44 and the tilting guide groove 50, and is made of a hollow cylindrical member using a resin such as a plastic of a low frictional coefficient, into which the guide pin 37a is inserted. In the guide ring 37b, a step portion to lock a head portion of the guide pin 37a is formed in the hollow interior, and at an insertion end of the shaft hole of the guide bearing 41, a protruded portion is formed, which is engageable with a step portion formed between the large-diameter portion and the small-diameter portion inside the shaft hole. In each of the above-described bearings 41, 41, the guide pin 37a inserted into the guide ring 37b threadably engages with the small-diameter portion of the shaft hole, and the protruded portion of the guide ring 37b engages with the step portion inside the shaft hole. At this time, the respective guide pins 37a, 37a are made to axially coincide with each other, and this axis is perpendicular to the optical axis of the swinging and tilting lens 30 and the axis of the support pins 36, 36.

The fixed ring 34 has a hollow cylindrical shape with both ends in a length direction opened, and rotatably supports the lens holding frame 33 in a hollow interior. This fixed ring 34 is supported by a fixed cylinder 55 of the rotational operation mechanism 32 described later, by which the swinging and tilting lens 30 makes up the PC optical system 25 of the PC lens 20 together with the focus lens group 22 and the fixed lens group 23. In the fixed ring 34, a pair of support holes 43, 43 corresponding to the turning bearings 40 formed on the lens holding frame 33 is formed in an outer peripheral surface 34a. The support holes 43, 43 communicate with the turning bearings 40, 40 of the lens holding frame 33, and have the support pins 36 inserted therethrough. This allows the fixed ring 34 to rotatably support the lens holding frame 33 with the support pins 36 used as spindles.

Moreover, in the fixed ring 34, the pair of tilting support grooves 44 is formed in the outer peripheral surface 34a, corresponding to the guide bearings 41 formed on the lens holding frame 33. Each of the tilting support grooves 44 is formed into an oval whose long side extends parallel to the optical axis direction of the PC optical system 25. The guide members 37 fitted in the guide bearings 41 are inserted through these groove 44. The fixed ring 34 supports the lens holding frame 33 tiltably along the length of the tilting support grooves 44 by inserting the guide members 37 through the tilting support grooves 44.

Furthermore, in the fixed ring 34, a gear portion 45 to be coupled to a first operation ring 57 of the rotational operation mechanism 32 described later through a gear mechanism 59 is formed on a front surface side of the outer peripheral surface 34a. The gear portion 45 rims the outer peripheral surface 34a all the way round and rotates the swinging and tilting mechanism 31 responsive to rotational operation of the first operation ring 57. A flange portion is provided all the way round the front surface side of the outer peripheral surface 34a of the fixed ring 34, and the above-described gear portion 45 is formed in a side surface of this flange portion.

In the fixed ring 34, a regulating pin 46 is provided upright that discourages the coming off of the rotary ring 35 fitted outside the outer peripheral surface 34a, and regulates a turning range of the rotary ring 35. The regulating pin 46 is inserted into a shaft hole formed on a back surface side of the outer peripheral surface 34a after the rotary ring 35 is fitted onto the fixed ring 34.

The rotary ring 35 has a hollow cylindrical shape with both ends thereof opened, and is fitted from the back surface side opposite to the front surface side of the fixed ring 34 where the gear portion 45 is formed. In the rotary ring 35, the pair of tilting guide grooves 50, 50 through which the guide members 37 are inserted, and a notched portion 51 on which the regulating pin 46 abuts are formed in an outer peripheral surface 35a.

In each of the tilting guide grooves 50, 50, there is formed an inclination portion 52 that inclines with respect to the optical axis of the PC optical system 25 by being formed from a front surface side to a back surface side along a circumference of the outer peripheral surface 35a. The tilting guide grooves 50, 50 regulate tilting of the swinging and tilting lens 30 held by the lens holding frame 33 by tilting the guide members 37 in the optical axis directions along the tilting support grooves 44, and as the rotary ring 35 is rotated on the outer peripheral surface 34a of the fixed ring 34, the guide members 37 are guided by the inclination portions 52 so as to move through the tilting support grooves 44 between the front surface side and the back surface side of the fixed ring 34. Accordingly, the rotary ring 35 can adjust the tilting of the swinging and tilting lens 30 held by the lens holding frame 33 proportional to a rotation amount relative to the fixed ring 34.

The pair of tilting guide grooves 50, 50 is formed so that a straight line connecting a central point in a width direction at any position and a central point in a width direction at a position mutually opposed to the above-mentioned any position passes one point of the optical axis of the PC optical system 25. As described above, in the guide members 37, the axes of the paired guide pins 37a, 37a are made to coincide with each other, and this axis is perpendicular to the optical axis of the swinging and tilting lens 30 and the axis of the support pins 36, 36. Accordingly, when the above-described guide members 37, 37 are guided by the tilting guide grooves 50, the swinging and tilting lens 30 held by the lens holding frame 33 is tilted while constantly intersecting its optical axis with the optical axis of the PC optical system 25. Consequently, the optical axis of the swinging and tilting lens 30 does not lose a contact point with the optical axis of the PC optical system 25.

The notched portion 51 is formed by circumferentially notching an end surface on the back surface side of the rotary ring 35. The regulating pin 46, which is provided upright on the outer peripheral surface 34a of the fixed ring 34, abuts on both end surfaces 51a, 51a in the circumferential direction, by which the notched portion 51 regulates the turning range of the rotary ring 35 with respect to the fixed ring 34.

In the rotary ring 35, a range in which the regulating pin 46 moves along the notched portion 51 corresponds to a range in which the guide members 37 are guided along the tilting guide grooves 50, and when each of the guide members 37 abuts on one end of the corresponding tilting guide groove 50, the regulating pin 46 abuts on one end surface of the notched portion 51, while when the guide member 37 abuts on the other end of the tilting guide groove 50, the regulating pin 46 abuts on the other end surface of the notched portion 51.

In the rotary ring 35, opening portions 53 for assembling the lens holding frame 33 on the fixed ring 34 are formed. The opening portions 53 are provided in the outer peripheral portion 35a of the rotary ring 35, corresponding to the support holes 43 of the fixed ring 34, and each have a circular shape having a little larger diameter than that of the support hole 43. When the rotary ring 35 turns on the outer periphery of the fixed ring 34, the opening portions 53 communicate with the support holes 43 formed in the outer peripheral portion 34a of the fixed ring 34. In the swinging and tilting mechanism 31, the lens holding frame 33 holding the swinging and tilting lens 30 is arranged inside the fixed ring 34, and the rotary ring 35 is fitted onto the fixed ring 34, after which the support holes 43 and the opening portions 53, as well as the support holes 43 and the turning bearings 40 of the lens holding frame 33 are made to communicate, and the support pins 36 are inserted into the turning bearings 40 through the opening portions 53 and the support holes 43 to thereby support the lens holding frame 33 inside the fixed ring 34.

The opening portions 53 may not be formed. In this case, the lens holding frame 33 is supported inside the fixed ring 34 beforehand. The support pins 36 each have a height not projecting out of the outer peripheral surface 34a even when it passes through the support hole 43 of the fixed ring 34, and thus, after the lens holding frame 33 is rotatably supported inside the fixed ring 34, the rotary ring 35 can be fitted onto the outer peripheral surface 34a of the fixed ring 34.

After the rotary ring 35 is fitted onto the fixed ring 34, the guide members 37 are inserted into the guide bearings 41 of the lens holding frame 33 through the tilting guide grooves 50 of the rotary ring 35 and the tilting support grooves 44 of the fixed ring 34. Moreover, in the fixed ring 34, the regulating pin 46 is inserted into the shaft hole in the outer peripheral surface 34a, the shaft hole being arranged to meet the notched portion 51 of the rotary ring 35.

In the above-described swinging and tilting mechanism 31, the rotary ring 35 is rotation-operated on the outer peripheral surface 34a of the fixed ring 34 circumferentially by a second operation ring 58 of the rotational operation mechanism 32 described later. This allows the rotary ring 35 to tilt the guide members 37 inserted through the tilting guide grooves 50 between the front surface side and the back surface side of the outer peripheral surface 35a. When the guide members 37 are guided by the tilting guide grooves 50, the lens holding frame 33 is tilted along the tilting support grooves 44 of the fixed ring 34 with the support pins 36 inserted into the support holes 43 of the fixed ring 34 used as turning spindles, and the optical axis of the swinging and tilting lens 30 is swung and tilted at a predetermined angle with respect to the optical axis of the other lens groups making up the PC optical system 25. This allows the optical axis of the PC optical system 25 to be tilted with respect to the imager device arranged inside the camera body 2, so that the swinging and tilting photographing is enabled. In the swinging and tilting mechanism 31, the rotation amount of the rotary ring 35 with respect to the fixed ring 34 is controlled, by which a swinging and tilting angle of the swinging and tilting lens 30 can be regulated.

Figure 6A:
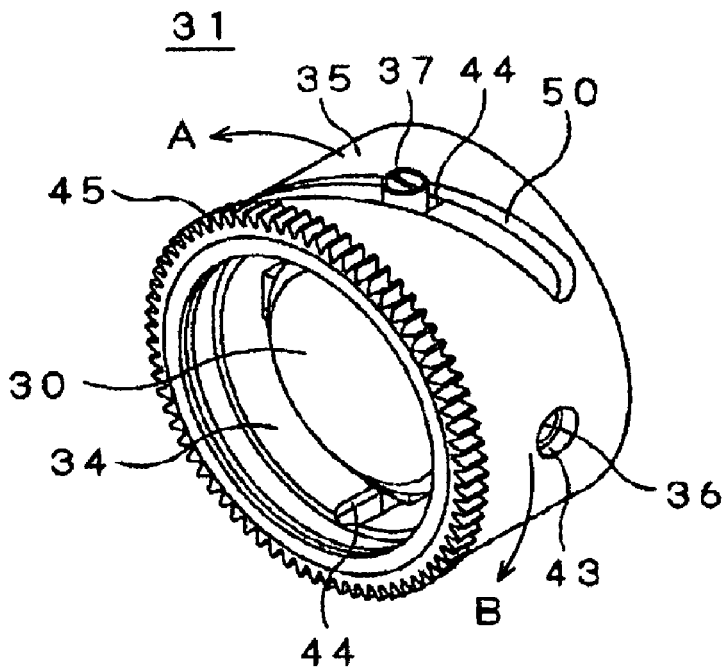
FIGS. 6A and 6B are a perspective view and a cross-sectional view respectively showing the swinging and tilting mechanism in a neutral position where a lens is not swung and tilted.
Figure 6B:
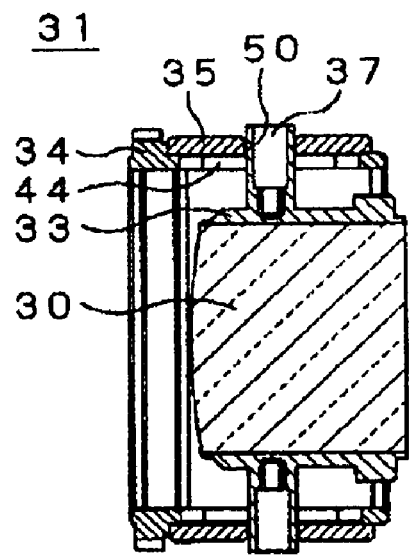

For example, as shown in FIGS. 6A and 6B, the swinging and tilting mechanism 31 is located in a neutral position where the swinging and tilting lens 30 is neither swung nor tilted, when each of the guide members 37 is located in a substantially intermediate position of the corresponding tilting guide groove 50. In the neutral position, the optical axis of the swinging and tilting lens 30 and the optical axis of the other lens groups of the PC optical system 25 are made to coincide with each other, and the optical axis of the PC optical system 25 is perpendicular to the imager device arranged inside the camera body 2. In the above-described neutral position, regardless of the rotational position of the fixed ring 34, the swinging and tilting lens 30 in the swinging and tilting mechanism 31 is neither swung nor tilted, and thus, normal photographing is enabled.

Figure 7A:
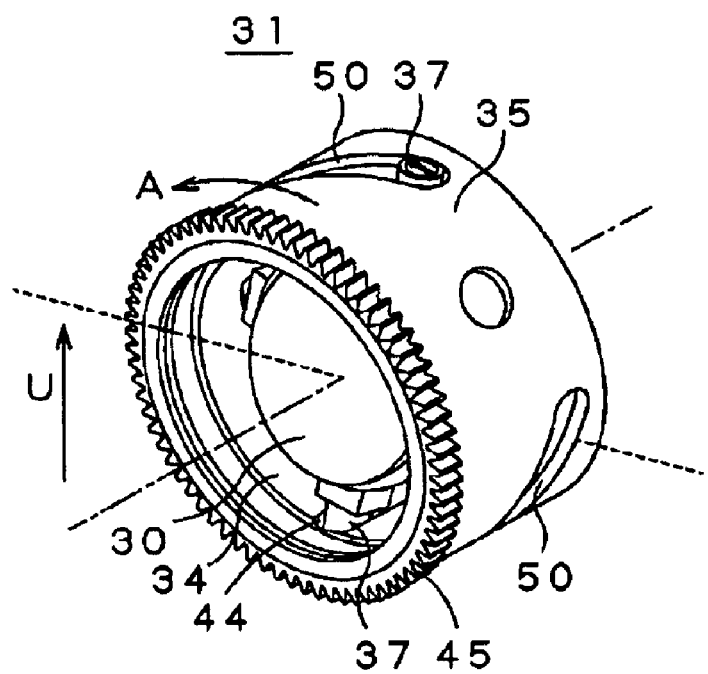
FIGS. 7A and 7B are a perspective view and a cross-sectional view respectively showing the swinging and tilting mechanism in a state where the lens is swung and tilted upward.
Figure 7B:
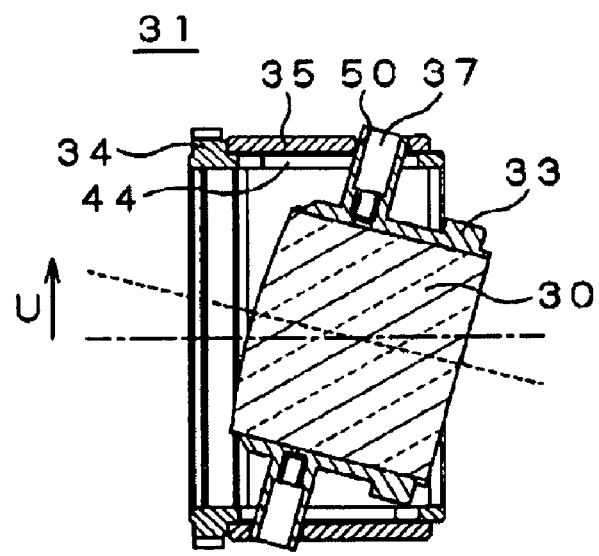

When the rotary ring 35 is rotated in an arrow A direction in FIG. 6A, then as shown in FIGS. 7A and 7B, in the swinging and tilting mechanism 31, the guide members 37 are guided by the tilting guide grooves 50, thereby being tilted while moving through the tilting support grooves 44 in one direction, so that the lens holding frame 33 is tilted in an arrow U direction in FIG. 7B. Thereby, in the swinging and tilting mechanism 31, the optical axis of the swinging and tilting lens 30 is swung and tilted upward with respect to the optical axis of the other lens groups of the PC optical system 25, and is also inclined with respect to the imager device arranged inside the camera body 2, which enables the swinging and tilting photographing.

Figure 8A:
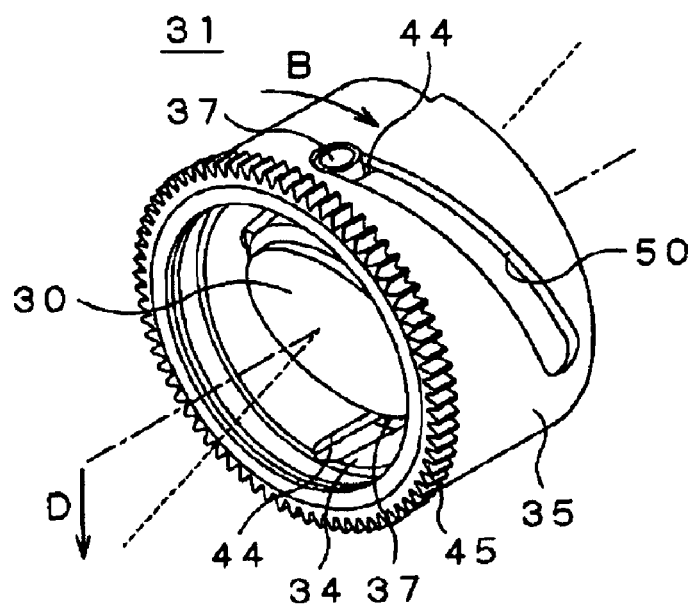
FIGS. 8A and 8B are a perspective view and a cross-sectional view respectively showing the swinging and tilting mechanism in a state where the lens is swung and tilted downward.
Figure 8B:
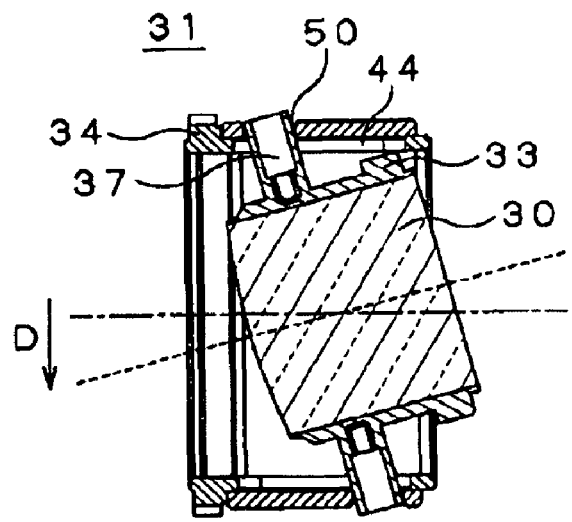

Moreover, when the rotary ring 35 is rotated in an arrow B direction in FIG. 6A, then as shown in FIGS. 8A and 8B, in the swinging and tilting mechanism 31, the guide members 37 are tilted in an arrow D direction in FIG. 8B. Thereby, in the swinging and tilting mechanism 31, the optical axis of the swinging and tilting lens 30 is swung and tilted downward with respect to the optical axis of the other lens groups of the PC optical system 25, and is also inclined with respect to the imager device arranged inside the camera body 2, which enables the swinging and tilting photographing.

The swinging and tilting angle of the swinging and tilting lens 30 can be adjusted by adjusting the rotation amount of the rotary ring 35 and thus by adjusting an inclination angle of the guide members 37 in the tilting support grooves 44. Moreover, a maximum swinging and tilting angle is set to, for example, ±15° with respect to the neutral position shown in FIGS. 6A and 6B.

The fixed ring 34 is rotated by the first operation ring 57 of the rotational operation mechanism 32, by which the swinging and tiling mechanism 31 is rotated about the optical axis of the PC optical system 25 while holding the position of the rotary ring 35 with respect to the fixed ring 34. Thereby, in the swinging and tiling mechanism 31, the swinging and tilting direction of the swinging and tilting lens 30 is determined proportional to the rotation amount of the fixed ring 34. In this manner, since the swinging and tilting mechanism 31 can set both the swinging and tilting direction and the swinging and tilting angle of the swinging and tilting lens 30, the swinging and tilting lens 30 can be swung and tilted at any angle.

Furthermore, in the swinging and tilting mechanism 31, the support pins 36 are inserted into the lens holding frame 33 holding the swinging and tilting lens 30 in one direction perpendicular to the optical axis of the swinging and tilting lens 3, and these support pins 36 are rotatably supported by the support holes 43 of the fixed ring 34, and further the guide members 37 are inserted in another direction perpendicular to the optical axis of the swinging and tilting lens 30 and the one direction where the support pins 36 are inserted, and at the same time, these guide members are inserted into, and supported by the linear tilting support grooves 44 formed along the optical axis direction in the fixed ring 34. Therefore, the position of the swinging and tilting lens 30 with respect to the fixed ring 34 is determined precisely. As described later, since the fixed ring 34 is fitted into the fixed cylinder 55 of the rotational operation mechanism 32, the swinging and tilting mechanism 31 allows the optical axis of the swinging and tilting lens 30 to precisely coincide with the optical axis of the other lens groups of the PC optical system 25, so that the centering can be reliably performed.

Figure 9:
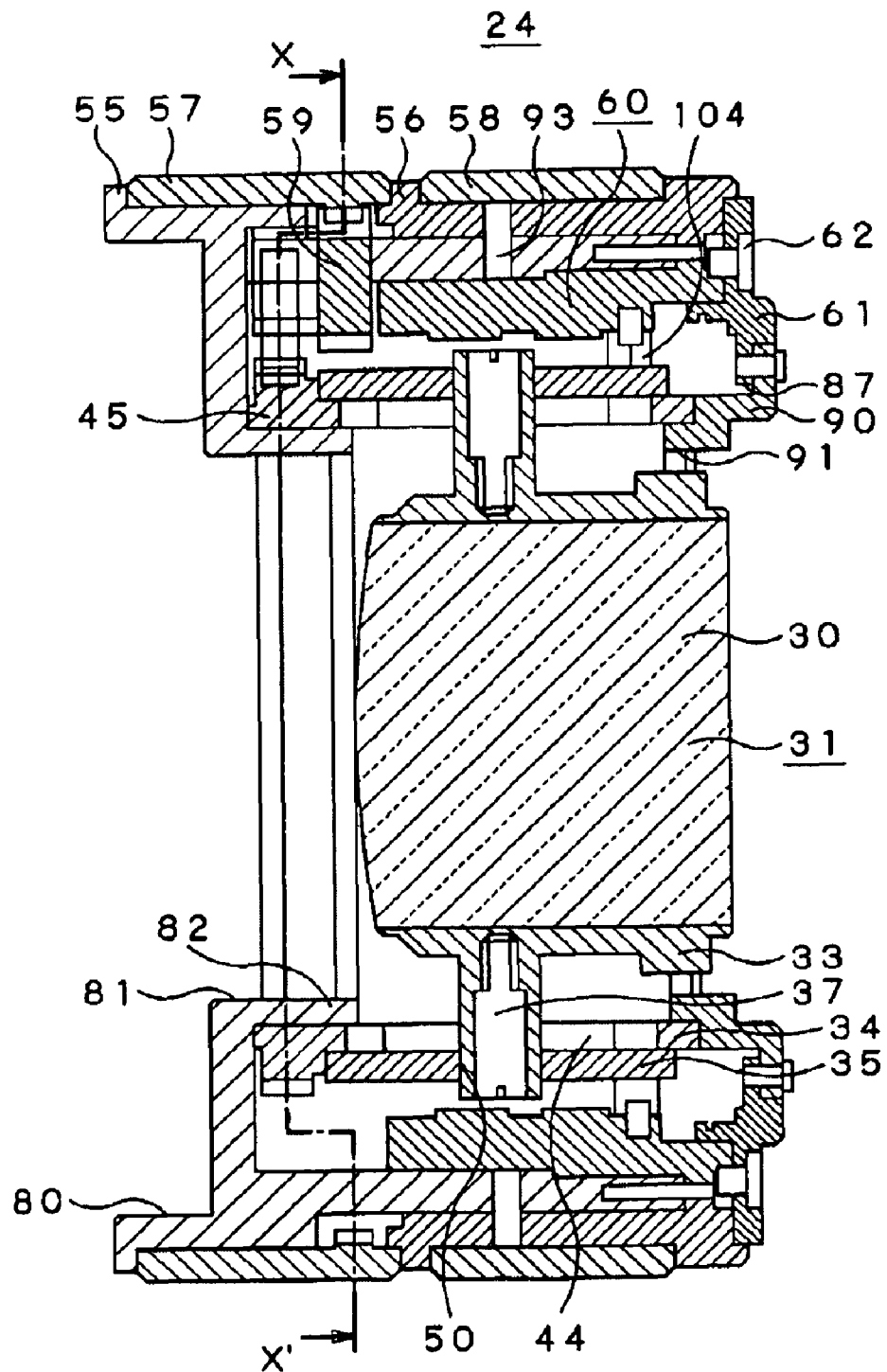
FIG. 9 is a cross-sectional view showing the swinging and tilting mechanism and a rotational operation mechanism.

Next, the rotational operation mechanism 32, which operates both the fixed ring 34 and the rotary ring 35 of the above-described swinging and tilting mechanism 31, is described. As shown in FIGS. 4 and 9, the rotational operation mechanism 32 includes the fixed cylinder 55 that makes up part of the lens barrel 21 of the PC lens 20 and turns the fixed ring 34 of the swinging and tilting mechanism 31, a fixed coupling cylinder 56 on which the fixed cylinder 55 and the mount ring 61 attached to or detached from the camera body 2 are mounted, the first and second operation rings 57, 58, the gear mechanism 59 that rotates the fixed ring 34 of the swinging and tilting mechanism 31 about the optical axis of the PC optical system 25 responsive to the rotational operation of the first operation ring 57, and a clutch mechanism 60 that rotates the rotary ring 35 of the swinging and tilting mechanism 31 independently of the fixed ring 34, responsive to the rotational operation of the second operation ring 58, and decouples the rotary ring 35 rotated responsive to the rotational operation of the first operation ring 57, from the second operation ring 58.

In this rotational operation mechanism 32, the fixed cylinder 55, the fixed coupling cylinder 56, the first and second operation rings 57, 58 and the clutch mechanism 60 each have a cylindrical shape, and the fixed coupling cylinder 56 and the first operation ring 57 are fitted onto an outer peripheral surface of the fixed cylinder 55, while the clutch mechanism 60 and the swinging and tilting mechanism 31 are supported inside the fixed cylinder 55. The fixed coupling cylinder 56 and the mount ring 61 are together fastened to a back surface of the fixed cylinder 55 by coupling screws 62 to thereby be integrated with the fixed cylinder 55. The second operation ring 58 is fitted onto an outer peripheral surface of the fixed coupling cylinder 56.

The rotational operation mechanism 32 incorporating the swinging and tilting mechanism 31 therein makes up part of the lens barrel 21 of the PC lens 20, or is detachably provided between the lens barrel 21 incorporating the focus lens group 22 and the fixed lens group 23 therein, and the camera body 2, to be attached as necessary when the swinging and tilting photographing is performed.

In the fixed cylinder 55, a guide groove 66 that guides the rotation of the first operation ring 57, and a gear fixing portion 67 where the gear mechanism 59 is arranged are formed on a front surface side 65a of an outer peripheral surface 65 onto which the first operation ring 57 is rotatably fitted. The guide groove 66 is formed along a circumferentially moving direction in the outer peripheral surface 65, with which a guide protrusion 76 provided along the circumferentially moving direction on an inner peripheral surface of the first operation ring 57 engages. The gear fixing portion 67 is a substantially rectangular opening portion provided on the front surface side 65a, and is opened in line with the guide groove 66. In the gear fixing portion 67, the gear mechanism 59 meshing with a gear portion 77 provided on the inner peripheral surface of the first operation ring 57 is arranged.

Figure 10:
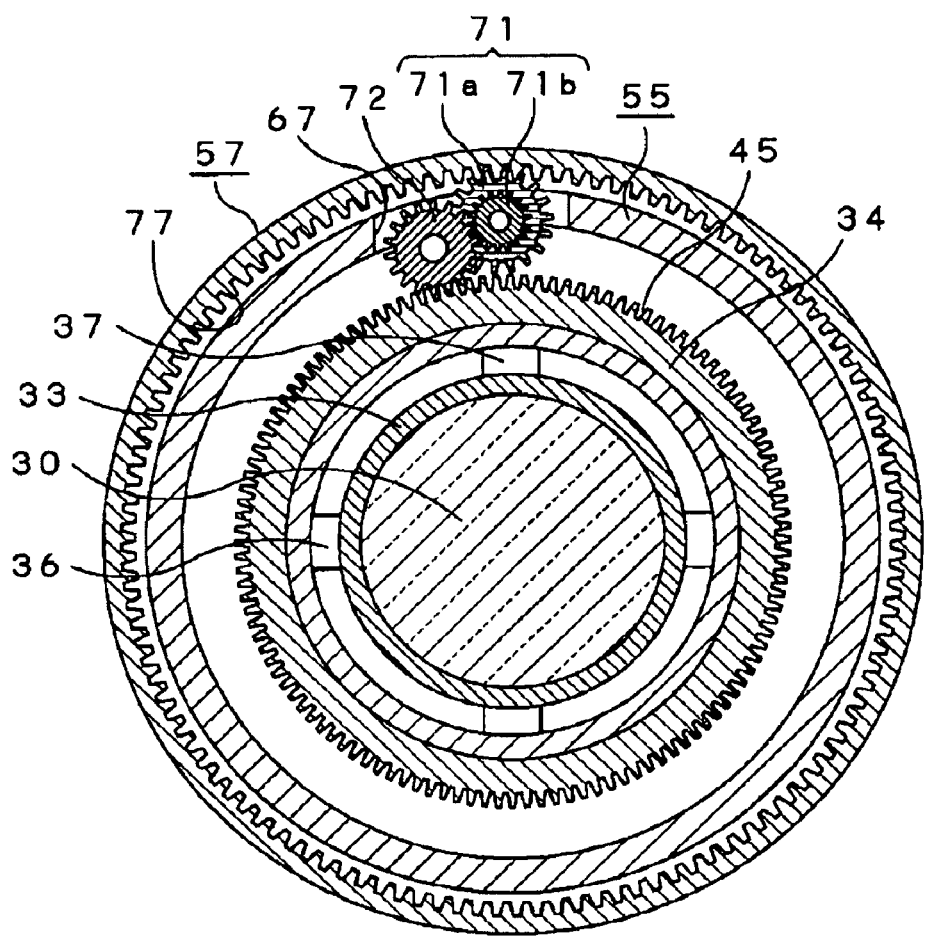
FIG. 10 is a cross-sectional view along x-x' in FIG. 9.

FIG. 10 shows a cross-sectional view along x-x' in FIG. 9. As shown in FIG. 10, the gear mechanism 59 includes a gear box 70 fitted into the gear fixing portion 67, and first and second gears 71, 72 rotatably supported inside the gear box 70. The first gear 71 is a two-step gear exposed to the outer peripheral surface 65 of the fixed cylinder 55, and has a large-diameter gear 71a meshable with the gear portion 77 formed on the inner peripheral surface of the first operation ring 57 rotating on the front surface side 65a, and a small-diameter gear 71b coaxial with the large-diameter gear 71a and meshable with the second gear 72. The second gear 72 is exposed to the inside of the fixed cylinder 55 from the gear box 70 to mesh with the gear portion 45 formed on the fixed ring 34 of the swinging and tilting mechanism 31 supported inside the fixed cylinder 55.

The first operation ring 57 fitted on the front surface side 65a of the outer peripheral surface 65 of the fixed cylinder 55 is coupled to the fixed ring 34 of the swinging and tilting mechanism 31 through the gear mechanism 59 to thereby rotation-operate the fixed ring 34, and has a substantially cylindrical shape. In the first operation ring 57, a knurling portion 75 for the rotational operation is formed on an outer peripheral surface 57a, and the guide protrusion 76 engageable with the guide groove 66 of the fixed cylinder 55, and the gear portion 77 meshable with the first gear 71 of the gear mechanism 59 are formed in an inner peripheral surface 57b.

The first operation ring 57 is fitted onto the outer peripheral surface 65 of the fixed cylinder 55 from the back surface side, by which the first operation ring 57 is rotatably sandwiched between a pair of flanges formed on the front surface side 65a of the outer peripheral surface 65 of the fixed cylinder 55, and has its guide protrusion 76 engaged with the guide groove 66, thereby discouraging its coming off from the fixed cylinder 55. As the first operation ring 57 is circumferentially rotated on the outer peripheral surface 65 of the fixed cylinder 55, the large-diameter gear 71a of the first gear 71 of the gear mechanism 59 meshed with the gear portion 77 is rotated, and the second gear 72 meshed with the small-diameter gear 71b formed coaxially with the large-diameter gear 71a is rotated, thereby rotating the fixed ring 34 of the swinging and tilting mechanism 31 having the gear portion 45 meshed with the second gear 72, in the same direction as the rotational direction of the first operation ring 57.

Here, as a gear data example shown in FIG. 9 indicates, the gear mechanism 59 is designed so as to satisfy a gear reduction ratio=1, so that a rotation amount of the first operation ring 57 and a rotation amount of the fixed ring 34 are substantially equal. Accordingly, the user rotation-operating the first operation ring 57 can intuitively grasp how much he or she has rotated the swinging and tilting lens 30, and thus set the swinging and tilting direction easily.

In the first operation ring 57, the guide protrusion 76 formed at substantially the same position as the gear portion 77 is guided by the guide groove 66 formed in the outer peripheral surface 65 of the fixed cylinder 55, thereby enabling smooth rotational operation.

In the outer peripheral surface 65 of the fixed cylinder 55, the fixed coupling ring 56 is fitted on a back surface side 65b, and slits 78 are formed at locations along the circumferentially moving direction. Through these slits 78, clutch coupling pins 93 projected on the second operation ring 58 fitted onto an outer peripheral surface 56a of the fixed coupling ring 56 are inserted.

In the fixed cylinder 55, there is formed a depressed surface portion 80 where a front end surface of the fixed cylinder 55 is depressed on the back surface side, and in an approximate center of this depressed surface portion 80, a circular opening portion 81 to expose the swinging and tilting mechanism 31 to the outside is opened. In the fixed cylinder 55, a cylindrical front surface supporting wall 82 is formed so as to continue from a peripheral surface of the opening portion 81 toward the back surface of the fixed cylinder 55. The front surface supporting wall 82 supports the fixed ring 34 of the swinging and tilting mechanism 31 arranged inside the fixed cylinder 55 from the front surface side, and has a cylindrical shape of substantially the same diameter as that of an inner peripheral surface of the fixed ring 34. The fixed ring 34 is engaged with the front surface supporting wall 82 on the front surface side, and is engaged with a support ring 90 mounted on the mount ring 61 described later, on the back surface side, thereby being rotatably supported inside the fixed cylinder 55.

In the fixed coupling ring 56 fitted on the back surface side 65b of the outer peripheral surface 65 of the fixed cylinder 55, the second operation ring 58 is fitted onto the outer peripheral surface 56a, and slits 83 are formed at locations along the circumferentially moving direction. Through these slits 83, the clutch coupling pins 93 projected on this second operation ring 58 are also inserted. The slits 83 communicate with the slits 78 formed in the outer peripheral surface 65 of the fixed cylinder 55 by fitting the fixed coupling ring 56 onto the fixed cylinder 55, so that the clutch coupling pins 93 can be inserted up to the clutch mechanism 60 arranged inside the fixed cylinder 55.

In this fixed coupling ring 56, the mount ring 61 to be attached to, and detached from the lens mount 5 of the camera body 2 is mounted on an end surface on a back surface side. The mount ring 61 has a disk shape with a center thereof opened circularly, and a mount portion 84 engageable with, or disengageable from the lens mount 5 is formed on one surface side opposed to the lens mount 5 of the camera body 2, and an engagement projected portion 85 engageable with a back surface of the fixed coupling ring 56 is formed on the other surface side. Moreover, in the mount ring 61, a plurality of insertion holes 86 through which the coupling pins 62 are inserted are formed in a main surface portion that abuts on the back surface of the fixed coupling ring 56 by the engagement projected portion 85 engaging with the back surface of the fixed coupling ring 56. Moreover, in the fixed coupling ring 56 and the fixed cylinder 55, insertion holes for communication with these insertion holes 86 are also drilled in end surfaces on the back surface side, and as shown in FIG. 9, the respective insertion holes communicate with each other and the coupling screws 62 are inserted from the insertion hole 86 side of the mount ring 61, by which the fixed cylinder 55, the fixed coupling ring 56 and the mount ring 61 are integrated.

The support ring 90 that supports the back surface side of the fixed ring 34 of the swinging and tilting mechanism 31 is mounted on the mount ring 61. The support ring 90 is caused to abut on flange pieces 87 formed so as to project from an inner peripheral surface of the mount ring 61, and is screwed to be integrated with the mount ring 61. Moreover, in the support ring 90, a back surface supporting wall 91 extending from a front surface side so as to stick out through an opening of the mount ring 61 is formed. The back surface supporting wall 91 supports the fixed ring 34 of the swinging and tilting mechanism 31 arranged inside the fixed cylinder 55 from the back surface side, and has a cylindrical shape of substantially the same diameter as that of the inner peripheral surface of the fixed ring 34. The fixed ring 34 is engaged with the back surface supporting wall 91 on the back surface side, and is engaged with the front surface supporting wall 82 formed on the above-described fixed cylinder 55 on the front surface side, thereby being rotatably supported inside the fixed cylinder.

The second operation ring 58 fitted onto the fixed coupling ring 56 is coupled to the rotary ring 35 of the swinging and tilting mechanism 31 through the clutch mechanism 60 described later to thereby make the rotary ring 35 operable independently of the fixed ring 34, and has a substantially cylindrical shape. In the second operation ring 58, a knurling portion 92 for the rotational operation is formed on an outer peripheral surface 58a, and the clutch coupling pins 93 to be engaged with the clutch mechanism 60 are projected on an inner peripheral surface 58b.

The plurality of clutch coupling pins 93 are provided upright at predetermined intervals on the inner peripheral surface 58b of the second operation ring 58. Each of the clutch coupling pins 93 is coupled to an actuation ring 101 of the clutch mechanism 60 by passage through the slits 83, 78 respectively provided in the fixed coupling ring 56 and the fixed cylinder 55. Thereby, the second operation ring 58 rotates the rotary ring 35 of the swinging and tilting mechanism 31 engaged therewith through the clutch mechanism 60, when rotation-operated by the user.

Figure 12:
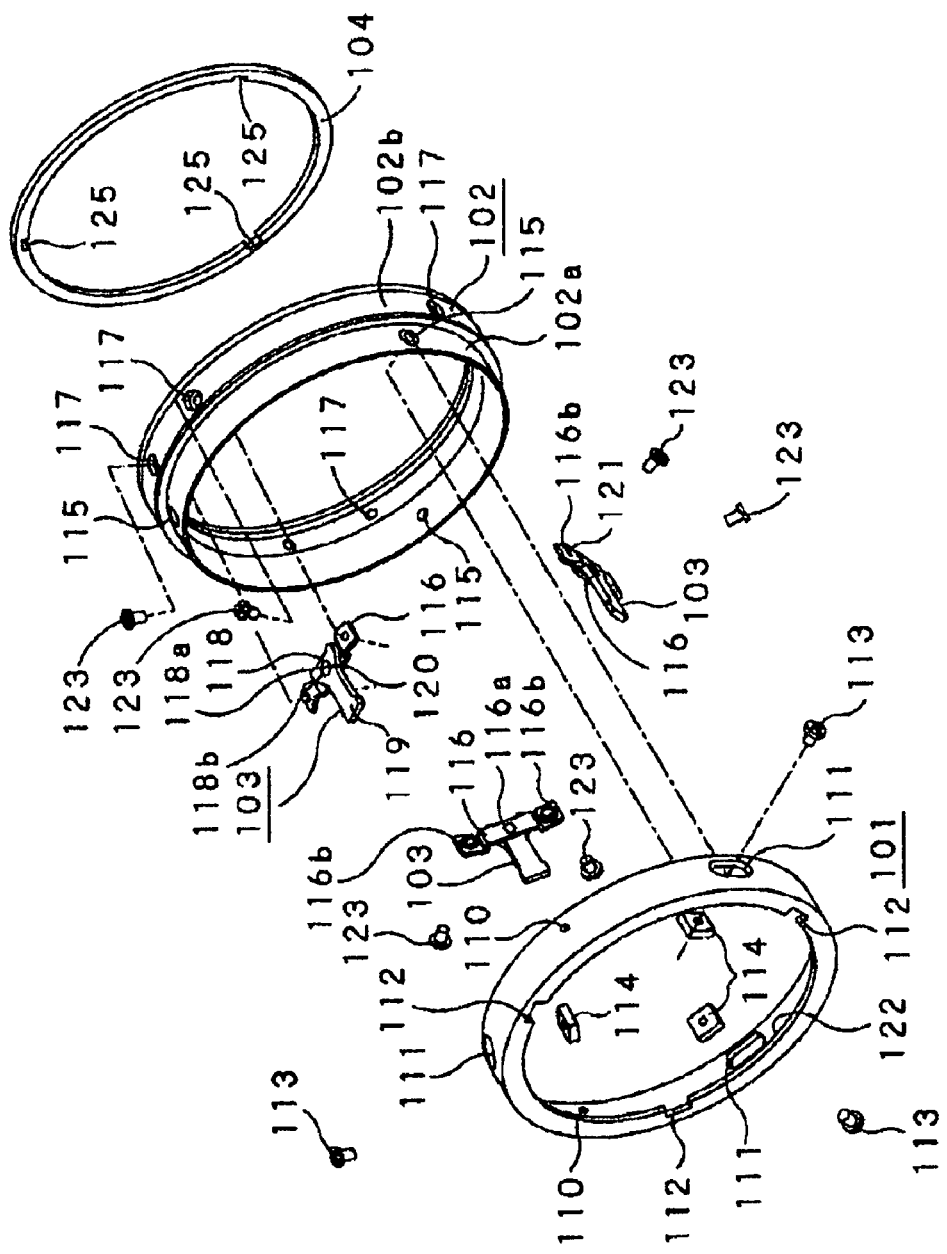
FIG. 12 is an exploded perspective view showing a clutch mechanism.

Subsequently, the clutch mechanism 60 is described. The clutch mechanism 60 integrally rotates the fixed ring 34 and the rotary ring 35, independently of the second operation ring 58, responsive to the operation of the first operation ring 57, and in addition, rotates the rotary ring 35 responsive to the rotational operation of the second operation ring 58. As shown in FIG. 12, the clutch mechanism 60 includes the actuation ring 101 that is coupled to the second operation ring 58, a base ring 102 onto which the actuation ring 101 is fitted, and clutch levers 103 that are swingably supported by the base ring 102 and are locked in the actuation ring 101, and a clutch ring 104 that is integrally fitted onto the rotary ring 35 and is engaged with and disengaged from the clutch levers 103. The clutch mechanism 60 is arranged between the fixed cylinder 55 and the swinging and tilting mechanism 31.

The actuation ring 101 is coupled to the second operation ring 58, and is rotated together with the second operation ring 58 to thereby turn the clutch levers 103 supported by the base ring 102. This actuation ring 101 has a cylindrical shape, and is fitted onto the base ring 102 swingably. The actuation ring 101 has pin insertion holes 110 into which the clutch coupling pins 93 projected in the second operation ring 58 are inserted, coupling holes 111 for coupling to the base ring 102, and locking depressed portions 112 that each lock a tip end of the clutch lever 103.

The plurality of pin insertion holes 110 are formed at predetermined intervals in a peripheral surface of the actuation ring 101, corresponding to the clutch coupling pins 93. In the actuation ring 101, the clutch coupling pins 93 are inserted into the pin insertion holes 110 via the slits 78, 83 formed respectively in the fixed cylinder 55 and the fixed coupling ring 56, by which the actuation ring 101 is integrated with the second operation ring 58, and is enabled to rotate together with the second operation ring 58.

The plurality of coupling holes 111 are formed at predetermined intervals in the peripheral surface of the actuation ring 101, and communicate with screw holes 115 formed in a peripheral surface of the base ring 102 by fitting the actuation ring 101 onto the base ring 102. The actuation ring 101 is coupled to the base ring 102 by inserting, in this state, screws 113 through the coupling holes 111 and the screw holes 115 to be mounted on nuts 114 arranged on the inner peripheral surface side of the base ring 102. Moreover, the coupling holes 111 each have an elliptical shape whose long side extends in a circumferential direction. Accordingly, the actuation ring 101 is fitted onto the base ring 102 swingably in the circumferential direction.

The locking depressed portions 112 in which the clutch levers 103 are locked are each formed by notching part of a front edge 122 formed on the front surface side of the actuation ring 101 into a rectangular shape. Each of the locking depressed portions 112 swings the clutch lever 103 responsive to the rotation of the actuation ring 101 by locking the tip end of the clutch lever 103 supported by the base ring 102. The plurality of locking depressed portions 112 are formed at predetermined intervals in accordance with supporting positions of the clutch levers 103.

The base ring 102 onto which the actuation ring 101 is fitted supports the clutch levers 103, and engages the clutch levers 103 with the clutch ring 104 responsive to the rotation of the actuation ring 101. The base ring 102 has a small-diameter portion 102a onto which the actuation ring 101 is fitted, and a large-diameter portion 102b that supports the clutch levers 103. In the small-diameter portion 102a, the plurality of screw holes 115 are formed at locations along the circumferential direction, corresponding to the coupling holes 111 formed in the peripheral surface of the actuation ring 101. By being connected to the actuation ring 101 through the screw holes 115, the base ring 102 is rotated together with the actuation ring 101 when the second operation ring 58 is rotation-operated. In the large-diameter hole 102b, screw holes 117 for screwing support fixing members 116 that each support the clutch lever 103 are formed.

Each of the clutch levers 103 has a substantially rectangular shape, and has an engagement portion 118 that is formed at one end in a longitudinal direction and comes into contact with, or off from the clutch ring 104, and a locking portion 119 that is locked in the locking depressed portion 112 at the other end in the longitudinal direction. The engagement portion 118 has a pair of projected portions 118a, 118a spaced apart from each other widthwise, and an engagement hole 118b that turnably engages the clutch lever 103 with the large-diameter portion 102b of the base ring 102. The projected portions 118a are opposed to the clutch ring 104 by being projected on the back surface side of the base ring 102, so that it can come into slide contact with the clutch ring 104 as the swing of the clutch lever 103 swings. A rivet 120 is inserted into the engagement hole 118b so that the clutch lever 103 is turnably coupled to the support fixing member 116. The locking portion 119 rotates the clutch lever 103 with the rivet 120 used as a rotation spindle responsive to the rotational operation of the actuation ring 101 by being locked in the above-described locking depressed portion 112 of the actuation ring 101. The clutch lever 103 is rotated by its locking portion 119, by which the projected portions 118a are swung in an direction opposite to a rotational direction of the actuation ring 101 to be exposed to a turning area of the clutch ring 104 and pressed onto the clutch ring 104, thereby causing integral turning.

The support fixing member 116 has a coupling plate portion 116a to which the clutch lever 103 is coupled by the rivet 120 and locking plate portions 116b that are formed on both sides interposing the coupling plate portion 116a, and are screwed with the large-diameter portion 102b of the base ring 102. In the support fixing member 116, an insertion hole into which the rivet 120 is inserted is formed in the coupling plate portion 116a, and locking holes 121 for communication with the screw holes 117 formed in the large-diameter portion 102b of the base ring 102 are formed.

In the above-described support fixing member 116, once the clutch lever 103 is coupled to the coupling plate portion 116a, the locking holes 121 of the locking plate portions 116b communicate with the screw holes 117 in the large-diameter portion 102b of the base ring 102. At this time, the locking portion 119 of the clutch lever 103 is locked in the locking depressed portion 112 of the actuation ring 101, which has been fitted onto the small-diameter portion 102a of the base ring 102. In this state, the support fixing member 116 locks the clutch lever 103 in the base ring 102 by its locking holes 121 being threadably engaged by screws 123 inserted through the screw holes 117 of the large-diameter portion 102b.

The clutch ring 104 that is engaged with the projected portions 118a formed on the engagement portions 118 of the clutch levers 103 is supported by a guide depressed portion formed in an inner peripheral surface of the large-diameter portion 102b of the base ring 102, thereby being supported rotatably in a circumferential direction of the base ring 102. By being supported inside the base ring 102, the clutch ring 104 is enabled to engage with, and disengaged from the projected portions 118a of the clutch levers 103 supported on the inner peripheral surface of the large-diameter portion 102b. Moreover, in the clutch ring 104, notched portions 125 are formed in an inner peripheral surface, through which the clutch ring 104 is connected to the rotary ring 35 of the swinging and tilting mechanism 31.

In the above-described clutch mechanism 60, when the second operation ring 58 is rotation-operated by the user in one direction, the actuation ring 101 is rotated in the same direction as the rotational direction of the second operation ring 58 with respect to the base ring 102, so that the locking portions 119 of the clutch levers 103 are swung and biased in the one direction, and the projected portions 118a of the engagement portions 118 are swung and biased in a direction opposite to a rotational direction of the base ring 102 to be pressed onto the clutch ring 104. Moreover, the screws 113 inserted through the actuation ring 101 and the base ring 102 each abut on one end in the longitudinal direction of the coupling hole 111 to integrally rotate the actuation ring 101 and the base ring 102 in the same direction as the rotational direction of the second operation ring 58. In this manner, in the clutch mechanism 60, by integrating the clutch levers 103 and the clutch ring 104, the second operation ring 58 and the rotary ring 35 of the swinging and tilting mechanism 31 are connected, and when the second operation ring 58 is rotated in one direction, the rotary ring 35 is rotated in the same direction as that of the second operation ring 58 together with the clutch ring 104.

Moreover, in the clutch mechanism 60, when the fixed ring 34 of the swinging and tilting mechanism 31 is rotated responsive to the rotational operation of the first operation ring 57, the rotary ring 35 supported by the fixed ring 34 and the clutch ring 104 connected to the rotary ring 35 are rotated in the same direction as that of the first operation ring 57. At this time, no biasing force by the actuation ring 101 is applied to the clutch levers 103 because the second operation ring 58 is not rotation-operated, and each of the clutch levers 103 can be swung with the rivet 120 used as a rotation spindle, so that the projected portions 118a are enabled to move into or retreat from the clutch ring 104. Accordingly, in the clutch mechanism 60, even if the clutch ring 104 is rotated, the clutch ring 104 is not integrated with the projected portions 118a, so that the rotary ring 35 and the second operation ring 58 are not connected. Consequently, the clutch mechanism 60 rotates the whole swinging and tilting mechanism 31 with the first operation ring 57 disconnected from the second operation ring 58.

According to the rotational operation mechanism 32 including the above-described clutch mechanism 60, in the swinging and tilting mechanism 31, the rotational operation of the second operation ring 58 results in only independent rotational operation of the rotary ring 35, and tilts the optical axis of the swinging and tilting lens 30 with respect to the optical axis of the other lens groups of the PC optical system 25, or with respect to the imager device arranged inside the camera body 2, thereby enabling the adjustment of the swinging and tilting amount. Moreover, in the swinging and tilting mechanism 31, the rotational operation of the first operation ring 57 results in the integral rotational operation of the fixed ring 34 and the rotary ring 35, so that the swinging and tilting direction of the swinging and tilting mechanism 31 can be set omnidirectionally. At this time, in the clutch mechanism 60, the second operation ring 58 is disconnected from the rotary ring 35, the second operation ring 58 is not rotated by the operation of the first operation ring 57. Accordingly, the swinging and tilting direction can be controlled by the first operation ring 57, and the swinging and tilting amount can be controlled by the second operation ring 58.

In one embodiment of the swinging and tilting mechanism 31 and the PC lens 20 according to the present invention, there may be formed a mechanism for holding the swinging and tilting lens 30 in the neutral position where the optical axis thereof is made to coincide with the optical axis of the other lens groups of the PC optical system 25 and is made perpendicular to the center of the imager device inside the camera body 2. In the following description, the same constitutions of the foregoing swinging and tilting mechanism 31 and PC lens 20 are given the same reference numerals, and detailed descriptions thereof are omitted.

As described above, the swinging and tilting mechanism 31 controls the swinging and tilting amount by the rotation of the rotary ring 35. That is, by the user rotating the second operation ring 58, the rotary ring 35 is rotated through the clutch mechanism 60, and the guide members 37 of the lens holding frame 33 are guided by the tilting guide grooves 50, and are thereby tilted along the tilting support grooves 44 of the fixed ring 34, resulting in the swinging and tilting of the swinging and tilting lens 30.

Figure 13A:
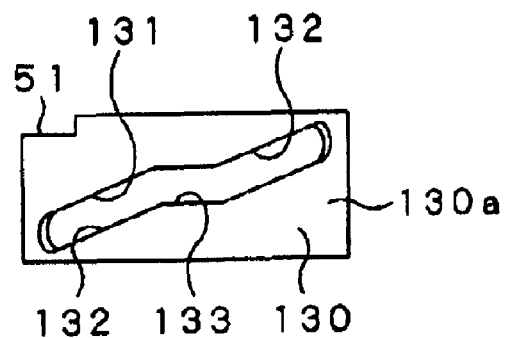
FIGS. 13A and 13B are a side view and a cross-sectional view respectively showing a rotary ring formed with inclination guide grooves each including inclination portions and a horizontal portion.
Figure 13B:
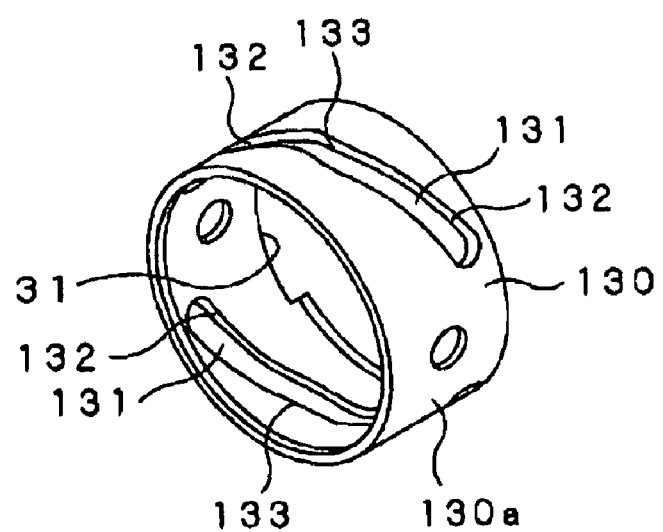

As shown in FIGS. 13A and 13B, in the swinging and tilting mechanism 31 holding the neutral position, tilting guide grooves 131 of a rotary ring 130 that fits onto the fixed ring 34 are each formed with inclination portions 132 and a horizontal portion 133. The inclination portions 132 incline the guide member 37 of the lens holding frame 33 along the tilting support groove 44, and the horizontal portion 133 that makes the guide member 37 of the lens holding frame 33 perpendicular to the optical axis of the PC optical system 25 to hold the swinging and tilting lens 30 in the neutral position.

The tilting guide grooves 131 extend in the circumferentially moving direction as well as from the front surface side to the back surface side in an outer peripheral surface 130a of the rotary ring 130, similar to the foregoing tilting guide grooves 50 of the rotary ring 35. Moreover, the pair of tilting guide grooves 131 is formed in the outer peripheral surface 130a, through each of which the guide member 37 inserted through the lens holding frame 33 is inserted.

Each of the tilting guide grooves 131 is made up of the inclination portions 132 that tilt the guide member 37 along the optical axis direction, and the horizontal portion 133 provided between the inclination portions 132. The inclination portions 132 incline with respect to the optical axis direction between the front surface side and the back surface side of the rotary ring 130, thereby moving the guide member 37 in the optical axis direction along the tilting support groove 44. Accordingly, when the rotary ring 130 is rotated, and the guide members 37 are guided by the inclination portions 132, the lens holding frame 33 is tilted, so that the swinging and tilting lens 30 is swung and tilted.

The horizontal portion 133 is formed in a direction perpendicular to the optical axis direction of the other lens groups of the PC optical system 25, or to a perpendicular direction with respect to the imager device surface inside the camera body 2, and guides the guide member 37 to thereby make the optical axis of the swinging and tilting lens 30 held by the lens holding frame 33 to coincide with the optical axis of the PC optical system 25, or perpendicular to an imager device surface of the camera body 2. That is, the horizontal portion 133 guides the guide member 37 of the lens holding frame 33, by which the swinging and tilting lens 30 is held in the neutral position.

The horizontal portion 133 is formed in a substantially intermediate position between the inclination portions 132, 132, and the guide member 37 is guided to one of the inclination portions 132 through the horizontal portion 133, by which the lens holding frame 33 is tilted in one direction, while the guide member 37 is guided to the other inclination portion 132 through the horizontal portion 133, by which the lens holding frame 33 is tilted in the other direction.

By using the rotary ring 130 in which the above-described horizontal portions 133 are formed, the swinging and tilting mechanism 31 can provide an area where the guide members 37 are guided by the horizontal portions 133, so that the swinging and tilting lens 30, which is continuously tilted by the rotation of the second operation ring 58, can be easily set in the neutral position.

The pair of tilting guide grooves 131, 131 formed in the rotary ring 130, similar to the foregoing tilting guide grooves 50, 50 of the rotary ring 35, is formed so that a straight line connecting a central point in a width direction in any position and a central point in a width direction in a position mutually opposed to the above-mentioned any position passes one point of the optical axis of the PC optical system 25, and the swinging and tilting lens 30 held by the lens holding frame 33 is tilted while constantly intersecting its optical axis with the optical axis of the PC optical system 25, so that the optical axis of the swinging and tilting lens 30 does not lose a contact point with the optical axis of the PC optical system 25. Moreover, in the rotary ring 130, the notched portion 51 for discouraging the coming off from the fixed ring 34 is also formed.

Moreover, the swinging and tilting mechanism 31 may be provided with a click mechanism 140 that gives click sensation when the swinging and tilting lens 30 is set in the neutral position, and further, gives click sensation when the swinging and tilting lens 30 is set in a reference position of the swinging and tilting direction. Here, the reference position of the swinging and tilting direction denotes a position where the guide members 37 of the lens holding frame 33 are supported by the tilting support grooves 44, 44 of the fixed ring 34 oriented toward a predetermined direction, and the lens holding frame 33 is tilted along the tilting support grooves 44, so that the swinging and tilting lens 30 is swung and tilted along the relevant predetermined direction. For example, the reference position is set as a position where the support holes 43, 43 of the fixed ring 34 are located in the horizontal direction, and the tilting support grooves 44, 44 are located in the vertical direction, by which the swinging and tilting lens 30 held by the lens holding frame 33 is swung and tilted toward the vertical direction by the rotation of the rotary ring 35. That is, in this reference position, when the camera 1 is gripped in a standard photographing attitude in which the photographing lens 3 of the camera 1 is oriented toward the horizontal direction, and the shutter button is oriented in a substantially vertical direction, the rotation of the second operation ring 58 allows the swinging and tilting lens 30 to be swung and tilted vertically upward, or vertically downward. The user can determine the swinging and tilting direction of the swinging and tilting lens 30 proportional to the rotational operation amount of the first operation ring 57 from this reference position. The reference position in the swinging and tilting direction can be set as a position where the swinging and tilting lens 30 is swung and tilted toward the horizontal direction and so on, in addition to the position where the swinging and tilting lens 30 can be swung and tilted toward the vertical direction.

Figure 14:
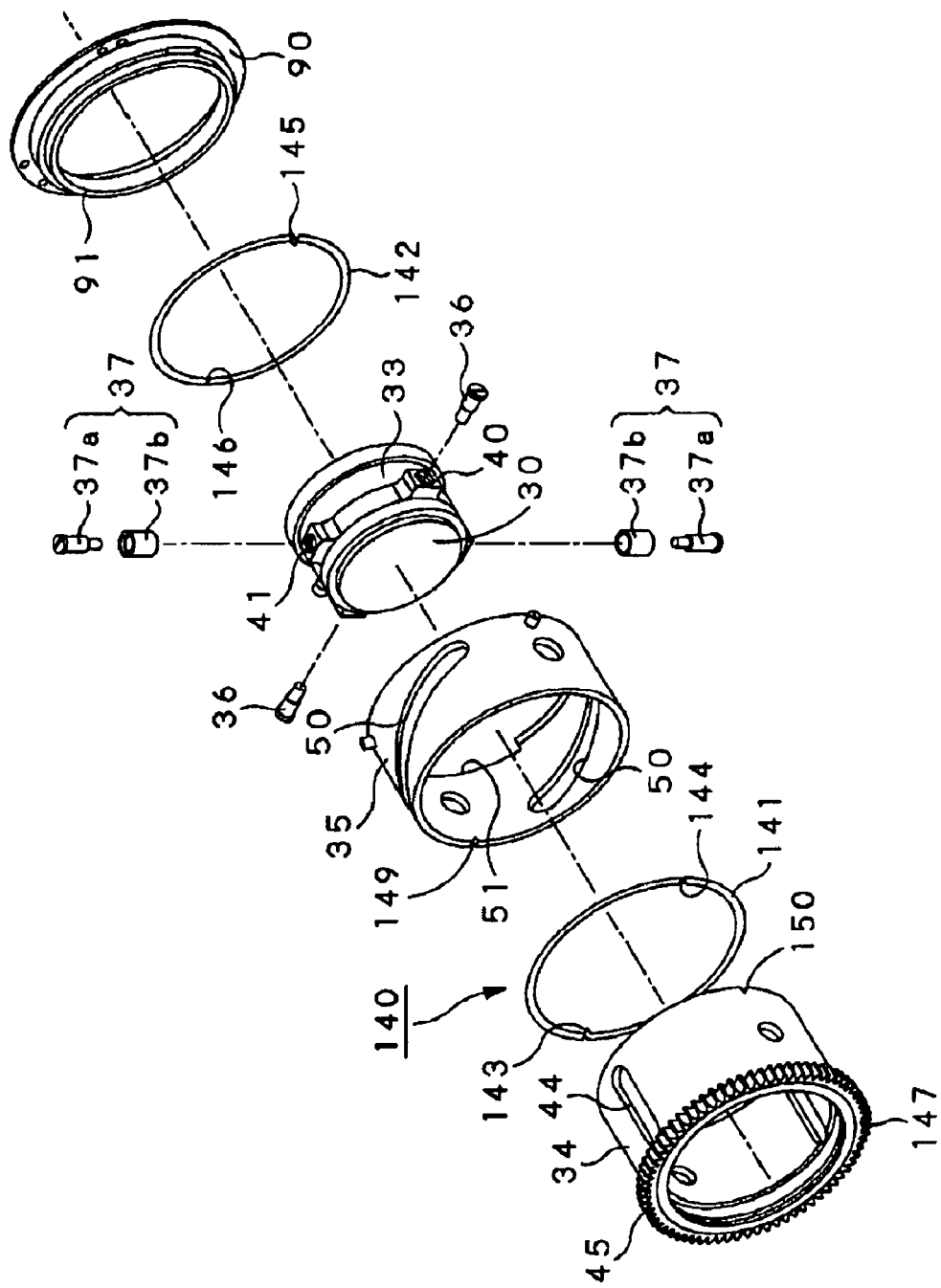
FIG. 14 is an exploded perspective view showing the swinging and tilting mechanism including a click mechanism from a front surface side.
Figure 15:
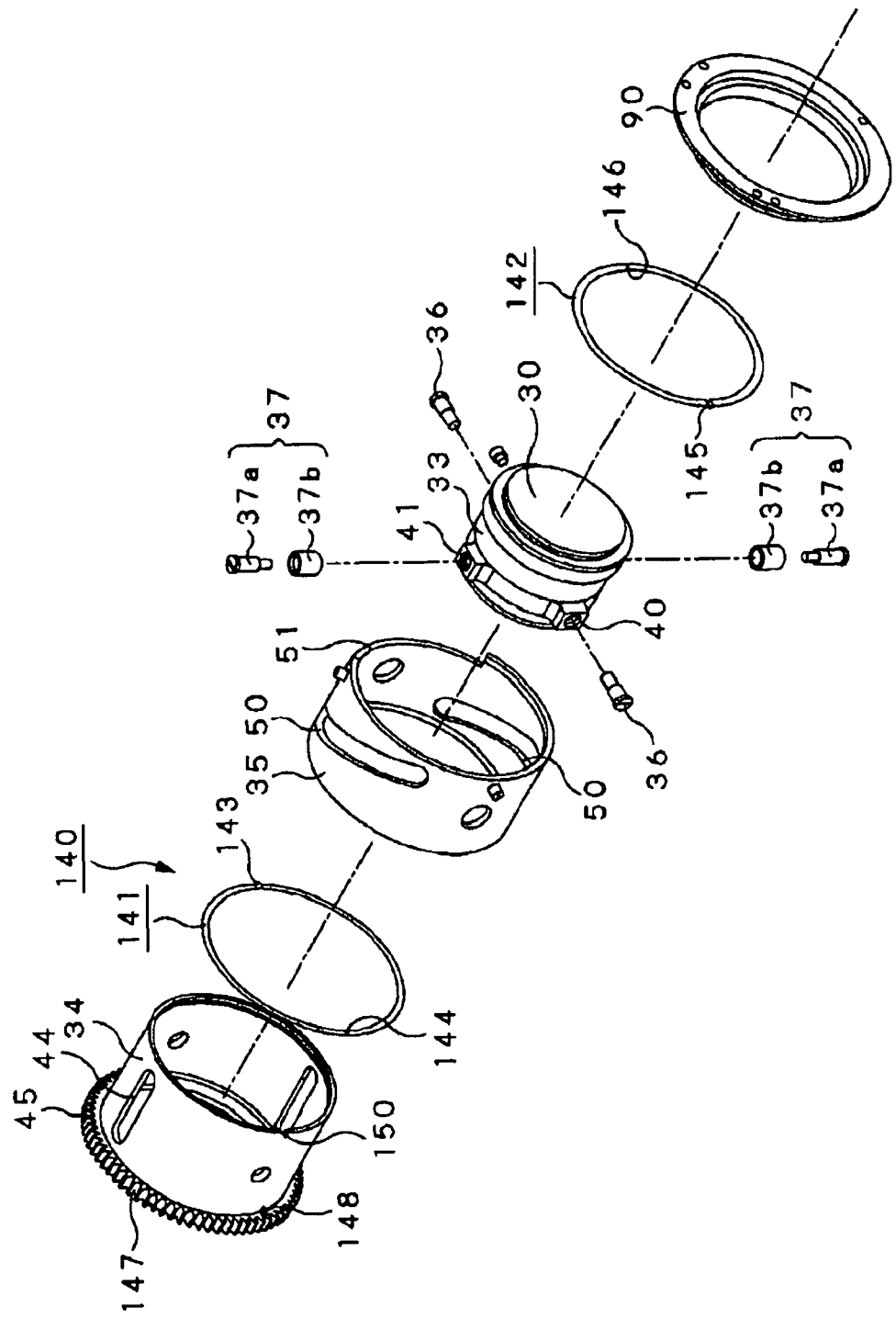
FIG. 15 is an exploded perspective view showing the swinging and tilting mechanism including the click mechanism from a back surface side.

As shown in FIGS. 14 and 15, the above-described click mechanism 140 includes a first click washer 141 engageable with the rotary ring 35 of the swinging and tilting mechanism 31 in the neutral position of the swinging and tilting lens 30, and a second click washer 142 engageable with the fixed ring 34 when the swinging and tilting mechanism 31 is rotated to the reference position of the swinging and tilting direction. These click washers 141, 142 are each formed into a circular ring shape made of a metal plate, for example, and in the first click washer 141, a click projected portion 143 and a depressed portion for engagement 144 are formed, while in the second click washer 142, a click projected portion 145 and a depressed portion for fitting 146 are formed.

The first click washer 141 is engaged with a flange portion 147 formed on the fixed ring 34 of the swinging and tilting mechanism 31, and is sandwiched between the flange portion 147 and a front end surface of the rotary ring 35. In the first click washer 141, the rectangular depressed portion for fitting 144 is formed in an inner peripheral surface, and into this depressed portion for fitting 144, a projected portion for fitting 148 projected on the flange portion 147 is fitted, by which the first click washer 141 is fixed to the fixed ring 34. At this time, the first click washer 141 is attached firmly to the flange portion 147 with the click projected portion 143 projected onto the front end surface side of the rotary ring 35. After the first click washer 141 is fitted into the flange portion 147, the rotary ring 35 is fitted onto the fixed ring 34.

The second click washer 142 is fitted onto the support ring 90 mounted on the foregoing mount ring 61, and is sandwiched between the support ring 90 and a rear end surface of the fixed ring 34. In the second click washer 142, the rectangular depressed portion for fitting 146 is formed in an inner peripheral surface, and into this depressed portion for fitting 146, a projected portion for fitting projected on the support ring 90 is fitted, similar to the projected portion for fitting 148 of the above-described flange portion 147, by which the second click washer 142 is fixed to the support ring 90. At this time, the second click washer 142 is attached firmly to the support ring 90 with the click projected portion 145 projected onto the rear end surface side of the fixed ring 34. After the second click washer 142 is fitted onto the support ring 90, the back surface support wall 91 is engaged with the back surface side of the fixed ring 34, by which the support ring 90 supports the fixed ring 34 inside the fixed cylinder 55, and sandwiches the second click washer 142 between the rear end surface of the fixed ring 34 and itself.

In the rotary ring 35, a click depressed portion 149 with which the click projected portion 143 of the first click washer 141 is engaged is formed in the front end surface thereof. When the rotary ring 35 is rotated to the position where each of the guide members 37 of the lens holding frame 33 is guided to a substantially intermediate point of the corresponding tilting guide groove 50, so that the swinging and tilting lens 30 is held in the neutral position, the click depressed portion 149 is engaged with the click projected portion 143.

Moreover, in the fixed ring 34, a click depressed portion 150 with which the click projected portion 145 of the second click washer 142 is engaged is formed in the rear end surface thereof. The click depressed portion 150 is engaged with the click projected portion 145 when the fixed ring 34 is rotated to the reference position.

FIGS. 16A to 16D show the swinging and tilting mechanism 31 set in the neutral position and in the reference position. In the above-described click mechanism 140, once by rotation-operating the second operation ring 58, the rotary ring 35 is rotated until the swinging and tilting lens 30 reaches the neutral position, as shown in FIG. 16B, the click projected portion 143 of the first click washer 141 is engaged with the click depressed portion 149 formed in the front end surface of the rotary ring 35 to hold the rotary ring 35 and give the click sensation to the user rotation-operating the second operation ring 58. Accordingly, the swinging and tilting lens 30, which is continuously being tilted by the rotation of the second operation ring 58, can be easily set in the neutral position.

Moreover, in the click mechanism 140, once by rotation-operating the first operation ring 57, the fixed ring 34 is rotated to the reference position, as shown in FIG. 16D, the click projected portion 145 of the second click washer 142 is engaged with the click depressed portion 150 formed in the rear end surface of the fixed ring 34 to hold the fixed ring 34 and give the click sensation to the user rotation-operating the first operation ring 57. Accordingly, the swinging and tilting lens 30, which is continuously being rotated by the rotation of the first operation ring 57, can be easily set in the reference position of the swinging and tilting direction.

In the click mechanism 140, the reference position of the swinging and tilting direction of the swinging and tilting mechanism 31 can be set in an arbitrary position by changing a relative position between the click depressed portion 150 formed in the rear end surface of the fixed ring 34 and the click projected portion 145 formed on the second click washer 142.

In another embodiment of the swinging and tilting mechanism 31 and the PC lens 20 according to the present invention, the fixed ring 34 and the first operation ring 57 may be directly coupled through fixed coupling pins to be projected on the inner peripheral surface 57b of the first operation ring 57, besides being coupled through the gear mechanism 59. In this case, in the outer peripheral surface 65 of the fixed cylinder 55 onto which the first operation ring 57 is fitted, insertion holes through which the fixed coupling pins are inserted are opened at locations along the circumferentially moving direction of the first operation ring 57. The fixed coupling pins are mounted on a front end portion of the fixed ring 34 through the insertion holes of the fixed cylinder 55 to be integrated with the fixed ring 34. The plurality of the fixed coupling pins are provided upright at predetermined intervals on the inner peripheral surface 57b of the first operation ring 57 to be coupled to the fixed ring 34 at a plurality of positions.

Thereby, in the swinging and tilting mechanism 31, when the first operation ring 57 rotation-operates the fixed cylinder 55, the fixed ring 34 is also rotated in the same direction as the rotational direction of the first operation ring 57, and is rotated in the rotation amount proportional to the rotation amount of the first operation ring 57. Accordingly, the user can intuitively grasp the rotation amount of the swinging and tilting lens 30 by rotation-operating the first operation ring 57, and thus can set the swinging and tilting direction easily. In the above-described swinging and tilting mechanism 31 and the PC lens 20, since only providing the fixed coupling pins upright allows the fixed ring 34 to be rotated, the gear mechanism is not used, and the gear portion 77 is not formed on the inner peripheral surface 57b of the first operation ring 57, and thus, the components can be reduced in number and the manufacturing steps can be simplified.

It should be understood by those skilled in the art that various modifications, combinations, sub-combinations and alterations may occur depending on design requirements and other factors insofar as they are within the scope of the appended claims or the equivalents thereof.

What is claimed is:

1. A swinging and tilting mechanism comprising:
   a lens;
   a lens holding frame
      for holding the lens and having a lens holding frame outer peripheral surface and a pair of guide members connected to and extending radially outwardly from the lens holding frame outer peripheral surface and diametrically relative to each other;
   a fixed ring sized for slidably receiving and rotatably supporting the lens holding frame along a first radial axis extending perpendicularly to an optical axis of an optical system and for supporting the lens holding frame tiltably about a second radial axis extending perpendicularly to the optical axis, the first and second radial axes being oriented perpendicularly relative to each other; and
   a rotary ring slidably fitted onto an outer periphery of the fixed ring and formed with a pair of guide grooves for slidably receiving and guiding respective ones of the pair of the guide members of the lens holding frame extending first though the fixed ring and operative to rotate the lens holding frame and the fixed ring about the optical axis and to tilt the lens holding frame only about the second radial axis.

2. The swinging and tilting mechanism according to claim 1, wherein:
   the fixed ring is made of a cylindrical member internally supporting the lens holding frame;
   the rotary ring is made of a cylindrical member supported rotatably along an outer peripheral surface of the fixed ring by fitting onto an outer periphery of the fixed ring, and is formed with a pair of guide grooves that operates the pair of guide members of the lens holding frame; and
   the optical axis, the first radial axis and the second radial axis intersect one another at an imaginary common point continuously as the lens holding frame and the fixed ring rotate about the optical axis and the lens holding frame tilts about the second radial axis.

3. The swinging and tilting mechanism according to claim 2, wherein each of the guide grooves is formed with a horizontal portion that extends perpendicularly to the optical axis and guides each of the guide members of the lens holding frame when an optical axis of the lens and the optical axis of the optical system are made to coincide with each other.

4. The swinging and tilting mechanism according to claim 2, wherein a click member that is engaged when the optical axis of the lens and the optical axis of the optical system are made to coincide is provided between the fixed ring and the rotary ring.

5. A lens barrel comprising:
   a swinging and tilting mechanism including:
   a lens;
   a lens holding frame for holding the lens and having a lens holding frame outer peripheral surface and a pair of guide members connected to and extending radially outwardly from the lens holding frame outer peripheral surface and diametrically relative to each other;
   a fixed ring sized for slidably receiving and rotatably supporting the lens holding frame along a first radial axis extending perpendicularly to an optical axis of an optical system and for supporting the lens holding frame tiltably about a second radial axis extending perpendicularly to the optical axis, the first and second radial axes being oriented perpendicularly relative to each other; and
   a rotary ring slidably fitted onto an outer periphery of the fixed ring and formed with a pair of guide grooves for slidably receiving and guiding respective ones of the pair of the guide members of the lens holding frame extending first though the fixed ring and operative to rotate the lens holding frame and the fixed ring about the optical axis and to tilt the lens holding frame about the second radial axis;
   a fixed cylinder that supports the swinging and tilting mechanism rotatably centered on the optical axis;
   a first operation member that is coupled to the fixed ring of the swinging and tilting mechanism to rotate the swinging and tilting mechanism centered on the optical axis; and
   a second operation member that is engaged with the rotary ring of the swinging and tilting mechanism to tilt the lens about the second radial axis.

6. The lens barrel according to claim 5, wherein:
   the first operation member is formed with a gear portion on an inner surface;
   the fixed ring is formed with a gear portion on an outer surface; and
   a gear mechanism that couples the respective gear portions provided on the first operation member and the fixed ring is provided between the first operation member and the fixed ring.

7. The lens barrel according to claim 6, wherein the gear mechanism is arranged so that a rotational direction of the first operation member and a rotational direction of the fixed ring are the same direction.

8. The lens barrel according to claim 6, wherein the gear mechanism is formed so that a rotational operation amount of the first operation member and a rotation amount of the fixed ring are substantially equal.

9. The lens barrel according to claim 5, wherein the first operation member and the fixed ring are coupled by a coupling member.

10. The lens barrel according to claim 5, comprising a clutch mechanism that separates the second operation member and the rotary ring when the swinging and tilting mechanism is rotated by the first operation member, and connects the same when the second operation member is rotated.

11. The lens barrel according to claim 5, wherein each of the guide grooves is formed with a horizontal portion that is perpendicular to the optical axis and guides each of the guide members of the lens holding frame when an optical axis of the lens and the optical axis of the optical system are made to coincide with each other.

12. The lens barrel according to claim 5, wherein a click member that is engaged when the optical axis of the lens and the optical axis of the optical system are made to coincide with each other is provided between the fixed ring and the rotary ring.

13. The lens barrel according to claim 5, wherein a click member that is engaged when the swinging and tilting mechanism is set in a predetermine reference position is provided between the fixed ring and a support member that supports the fixed ring together with the fixed cylinder.

14. An image capture apparatus comprising:
a swinging and tilting mechanism having:
a lens;
a lens holding frame for holding the lens and having a lens holding frame outer peripheral surface and a pair of guide members connected to and extending radially outwardly from the lens holding frame outer peripheral surface and diametrically relative to each other;
a fixed ring sized for slidably receiving and rotatably supporting the lens holding frame along a first radial axis extending perpendicularly to an optical axis of an optical system and for supporting the lens holding frame tiltably about a second radial axis extending perpendicularly to the optical axis, the first and second radial axes being oriented perpendicularly relative to each other; and
a rotary ring slidably fitted onto an outer periphery of the fixed ring and formed with a pair of guide grooves for slidably receiving and guiding respective ones of the pair of the guide members of the lens holding frame extending first though the fixed ring and operative to rotate the lens holding frame and the fixed ring about the optical axis and to tilt the lens holding frame only about the second radial axis.

* * * * *